(12) United States Patent　　　　　(10) Patent No.:　US 12,687,933 B1

LaChappelle　　　　　　　　　　　　　(45) Date of Patent:　　　Jul. 21, 2026

(54) HAPTIC GLOVE SYSTEMS

(71) Applicant: Unlimited Tomorrow, Inc., Readfield, ME (US)

(72) Inventor: Easton J. LaChappelle, Readfield, ME (US)

(73) Assignee: Unlimited Tomorrow, Inc., Readfield, MA (US)

( * ) Notice: Subject to any disclaimer, the term of this patent is extended or adjusted under 35 U.S.C. 154(b) by 0 days.

(21) Appl. No.: 19/413,028

(22) Filed: Dec. 9, 2025

Related U.S. Application Data

(60) Provisional application No. 63/729,695, filed on Dec. 9, 2024.

(51) Int. Cl.
　　*G06F 3/01*　　　　(2006.01)
　　*G06F 1/16*　　　　(2006.01)
　　*G06F 1/18*　　　　(2006.01)
(52) U.S. Cl.
　　CPC ............ *G06F 3/016* (2013.01); *G06F 1/1635* (2013.01); *G06F 1/189* (2013.01); *G06F 3/014* (2013.01)
(58) Field of Classification Search
　　CPC ........ G06F 3/016; G06F 1/1635; G06F 1/189; G06F 3/014
　　See application file for complete search history.

(56)　　　　　　References Cited

U.S. PATENT DOCUMENTS

| | | | | |
|---|---|---|---|---|
| 9,104,271 | B1 * | 8/2015 | Adams ................. | G06F 3/0233 |
| 10,248,200 | B2 * | 4/2019 | Cohen ................... | G06F 3/016 |
| 10,572,014 | B2 * | 2/2020 | Keller ................... | G06F 3/011 |
| 10,779,583 | B2 * | 9/2020 | Keller ................... | A41D 19/00 |
| 11,169,607 | B1 * | 11/2021 | Tompkins .............. | G06F 3/014 |
| 2006/0167564 | A1 * | 7/2006 | Flaherty ................. | A61B 5/11 |
| | | | | 623/57 |
| 2017/0165567 | A1 * | 6/2017 | Walters ................ | A63F 13/285 |
| 2024/0188659 | A1 * | 6/2024 | Brown ............... | F03G 7/06143 |

* cited by examiner

*Primary Examiner* — John A Tweel, Jr.
(74) *Attorney, Agent, or Firm* — Blank Rome LLP

(57)　　　　　　ABSTRACT

Haptic glove systems for providing vibration and for feedback associated with extended and virtual reality are disclosed. A haptic glove system includes an actuator pack, a first sheath configured to receive a first finger, and a first resistance cable connected between the first sheath and the actuator pack. A second sheath is configured to receive a second finger, and a second resistance cable is connected to the second sheath and to the first resistance cable such that the actuator pack retracts the first and second resistance cables together to resist closing of both sheaths. In some aspects, additional sheaths may be independently connected to the actuator pack by respective resistance cables for finger-specific force feedback. In certain implementations, resistance cables are routed around fingertip tips to provide localized squeezing sensations during retraction.

20 Claims, 12 Drawing Sheets

HAPTIC GLOVE SYSTEMS

CROSS REFERENCE TO RELATED APPLICATIONS

This application claims priority to U.S. Provisional Pat. Appl. No. 63/729,695, filed Dec. 9, 2024, the contents of which are incorporated by reference herein in their entirety.

TECHNICAL FIELD

This disclosure is generally directed to the field of extended reality technology, and more particularly to haptic glove systems capable of providing vibrotactile and force feedback.

BACKGROUND

Extended Reality (XR) technology encompasses a range of immersive digital experiences that blend the physical and virtual worlds. This can include Virtual Reality (VR), Augmented Reality (AR), and Mixed Reality (MR). VR creates a fully immersive digital environment, AR overlays digital information onto the real world, and MR combines elements of both, allowing for interaction between real and virtual objects. XR technologies leverage advanced hardware such as headsets, sensors, and haptic devices, along with sophisticated software algorithms to deliver seamless and interactive experiences. These technologies are increasingly being utilized across various industries, including gaming, healthcare, education, and manufacturing, to enhance user engagement, training, and operational efficiency.

The development of XR technology has been driven by significant advancements in computing power, graphics processing, and sensor technology. Innovations in machine learning and artificial intelligence have further enhanced the capabilities of XR systems, enabling more realistic and responsive interactions. Additionally, the proliferation of high-speed internet and 5G networks has facilitated the delivery of high-quality XR content with minimal latency. As a result, XR is poised to revolutionize how we interact with digital content, offering new possibilities for communication, collaboration, and entertainment. The ongoing research and development in this field continue to push the boundaries of what is possible, making XR a critical area of innovation in the tech industry.

BRIEF SUMMARY

Existing haptic feedback systems include hand-worn systems that exceed a native hand form factor. This may interfere with optical hand-tracking in head-mounted displays, prompting reliance on external trackers or beacons and adding hardware and software overhead. Aspects of this disclosure address this issue by providing compact haptic glove systems that remain within the bounds of a native form factor, thereby better facilitating optical hand-tracking.

One aspect is directed to a haptic glove system that comprises an actuator pack. The haptic glove system further comprises a first sheath configured to receive a first finger of a user. The haptic glove system additionally comprises a first resistance cable connected to the first sheath and to the actuator pack. The haptic glove system further comprises a second sheath configured to receive a second finger of the user. The haptic glove system additionally comprises a second resistance cable connected to the second sheath and to the first resistance cable. The actuator pack is configured to retract the first resistance cable together with the second resistance cable to resist closing of each of the first sheath and the second sheath.

Implementations may include one or more of the following features. The first sheath and the second sheath are configured to be moved by the user independently from each other when the actuator pack is inactive. The haptic glove system further comprises a main body, the main body comprises a recess, and the first resistance cable and the second resistance cable are coupled together via a junction that is movably contained within the recess. The first sheath and the second sheath are connected to the main body, and the actuator pack is positioned within the main body. The main body is positioned at a back of a hand of the user between knuckles and a wrist of the user when the haptic glove system is worn by the user. The main body projects a maximum amount outwardly away from the back of the hand of the user when the haptic glove system is worn by the user, and the maximum amount is less than about a half an inch. The haptic glove system further comprises a liner attached to the main body, and an outer glove that covers the actuator pack, the first sheath, the first resistance cable, the second sheath, and the second resistance cable. The haptic glove system further comprises a third sheath that is configured to receive a third finger of the user; a third resistance cable that independently connects the third sheath to the actuator pack; a fourth sheath that is configured to receive a fourth finger of the user; and a fourth resistance cable that independently connects the fourth sheath to the actuator pack. The actuator pack is configured to retract the third resistance cable to resist closing of the third sheath independently from the first sheath, the second sheath, and the fourth sheath. The actuator pack is configured to retract the fourth resistance cable to resist closing of the fourth sheath independently from each of the first sheath, the second sheath, and the third sheath. The actuator pack comprises a first actuator and a second actuator, and the first actuator is inverted and offset relative to the second actuator. The haptic glove system further comprises a processor configured to control the actuator pack and a battery. The processor is substantially symmetrical, the processor comprises a first power connector and a second power connector, and the first power connector is connected to the battery, and the second power connector is disconnected.

Another aspect is directed to a haptic glove system that comprises a sheath comprising a tip, the sheath being configured to receive a finger of a user. The haptic glove system further comprises a resistance cable routed circumferentially around the tip. Retraction of the resistance cable squeezes the tip, and the tip is biased in an open configuration such that the tip automatically reverts to the open configuration when the resistance cable is released after the retraction that squeezes the tip.

Implementations may include one or more of the following features. An actuator pack is connected to the resistance cable and is configured to retract the resistance cable. The haptic glove system further comprises a main body contoured to a hand of the user, the sheath of the haptic glove system is connected to the main body, the actuator pack is positioned within the main body. The main body, when worn by the user, holds the actuator pack at a back of the hand of the user. The main body comprises a plurality of relief cuts. The haptic glove system further comprises electronics and a battery that are positioned within the main body together with the actuator pack. The main body further comprises a portion contoured to a palm of the hand of the user. The haptic glove system further comprises a plurality of vibration motors, and the portion holds the plurality of vibration motors. The sheath comprises a first support contoured to at least part of a side of the finger of the user. The first support comprises a relief cut. The sheath further comprises a plurality of second supports extending from the first support, and the plurality of second supports are each contoured to a respective finger segment of the user. A plurality of vibration motors are each supported by a respective one of the plurality of second supports such that the plurality of vibration motors are held to a respective finger pad of the respective finger segment of the user when the sheath of the haptic glove system is worn by the user. The sheath for the haptic glove system further comprises at least one guide for guiding the resistance cable, and the at least one guide is supported by at least one third support. The at least one guide is supported opposite one of the plurality of vibration motors.

Various additional features and advantages of this invention will become apparent to those of ordinary skill in the art upon review of the following detailed description of the illustrative embodiments taken in conjunction with the accompanying drawings.

BRIEF DESCRIPTION OF THE SEVERAL VIEWS OF THE DRAWINGS

The following detailed description is better understood when read in conjunction with the appended drawings. For the purposes of illustration, examples are shown in the drawings; however, the subject matter is not limited to the specific elements and instrumentalities disclosed. In the drawings.

DETAILED DESCRIPTION

Figure 1:
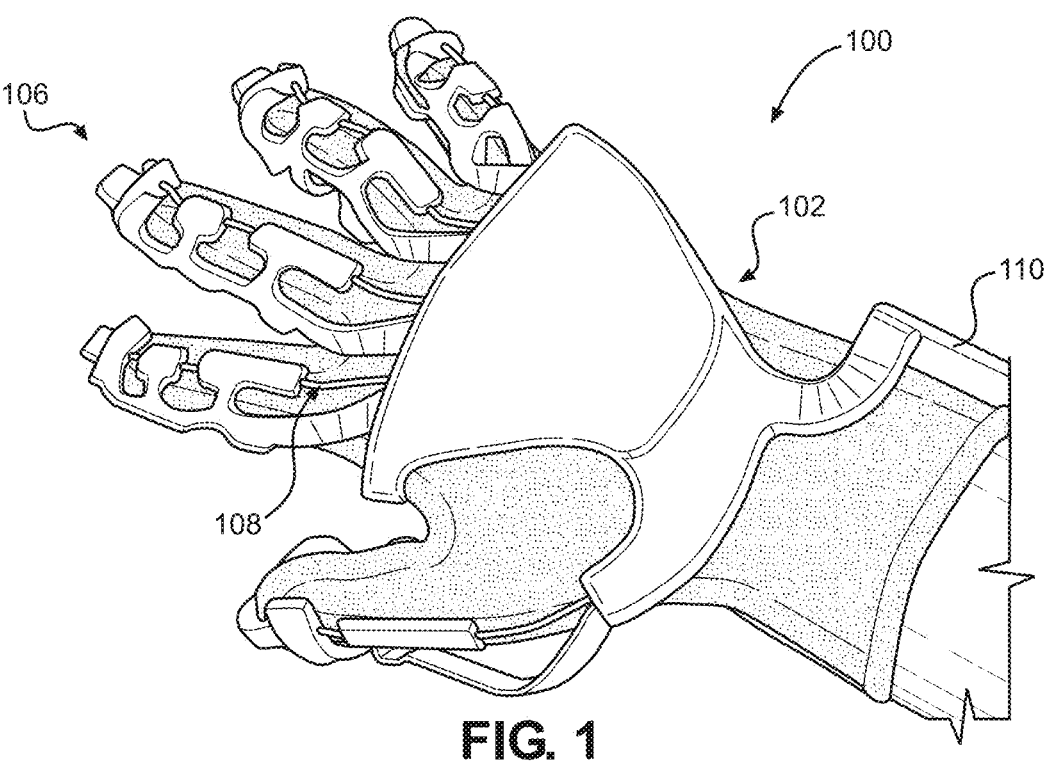
FIG. 1 illustrates a top perspective view of a haptic glove system according to aspects of this disclosure.

Haptic systems for extended reality applications can deliver vibrotactile feedback and force feedback. Existing approaches are bulky and include hand-worn systems that exceed a native hand form factor. This may interfere with optical hand-tracking in head-mounted displays, prompting reliance on external trackers or beacons and adding hardware and software overhead.

This disclosure is directed to advanced XR (extended reality) haptic glove systems, which can address prevalent limitations in current VR (virtual reality) and AR (augmented reality) technologies. The haptic glove systems of this disclosure can facilitate advanced tactile feedback during virtual interactions, significantly enhancing immersion in digital environments. The haptic glove systems can integrate at least two forms of haptic feedback: vibrotactile and force feedback. The haptic glove systems can include a number of vibration motors that can simulate surface textures, object movement and impacts, and can provide localized tactile sensations that can enhance the realism of virtual interactions.

Aspects of this disclosure are directed to compact haptic gloves that may deliver both vibrotactile and force feedback while preserving a slim, hand-conforming profile. In at least some embodiments, a main body may be contoured to the back of the hand and palm and may house actuation, power, and control electronics within a consolidated back-of-hand architecture. A plurality of finger sheaths may be contoured to respective fingers and may be coupled to an actuator pack by resistance cables that are routed through integrated channels of the main body. In at least some aspects, at least one actuator may be inverted and/or offset relative to another actuator to enable direct, low-friction exits into the integrated channels while maintaining a reduced Z-height. In certain implementations, two resistance cables may be mechanically joined, for example at a junction (e.g., a knot) positioned within a recess of the main body, so that a single actuator may apply resistance to two fingers while allowing lateral and/or vertical movement of the junction within the recess to preserve perceived independence of free finger motion. In at least some embodiments, a fingertip tip structure of each sheath may receive a routed resistance cable so that retraction of the cable may squeeze the tip to augment force feedback localized at the fingertip.

Vibrotactile feedback may be provided by vibration motors distributed at the palm, along finger segments, and at finger pads. The electronics architecture may include a rigid printed circuit board and a flex sub-assembly for vibrotactile routing, with metal stiffeners arranged to manage bend locations across stepped surfaces of the back-of-hand structure. In some aspects, the main rigid printed circuit board may include left-right symmetry features, such as two battery connectors where only one is populated in use, to facilitate mirrored glove variants without redesign. A liner and an outer glove may be provided to improve comfort, manage cable routing, and present a human-like silhouette that may remain within hand-tracking tolerances of headsets.

The haptic glove systems of this disclosure may provide multiple advantages. Consolidating actuators, electronics, and the battery into a back-of-hand portion may result in a lower profile, can reduce cable length and bends, and can improve balance. Integrated low-friction channels formed in the main body may reduce or eliminate separate tubing while supporting reliable resistance cable travel. Offsetting and/or inverting selected actuators may enable direct exits into routing channels that minimize interference and stack height, which may enhance manufacturability and responsiveness. Coupling two finger tendons by a junction positioned within a recess may reduce part count while preserving independence of finger motion during free movement and delivering coupled resistance during actuation. Routing resistance cables around fingertip tip structures may localize squeezing sensations that enhance realism. Flex/vibrotactile harnesses with stiffeners may conform to stepped surfaces without increasing bulk and may maintain flat spans for connectors, improving reliability. Symmetric, dual-connector PCB architecture may streamline production of right- and left-hand variants. The overall system may remain slim and lightweight, which may allow native hand-tracking systems of extended reality headsets to recognize the glove as a human hand, obviating external trackers and associated complexity. These and other aspects of the disclosure are shown in FIG. 1 through FIG. 19 and described further as follows.

Figure 2:
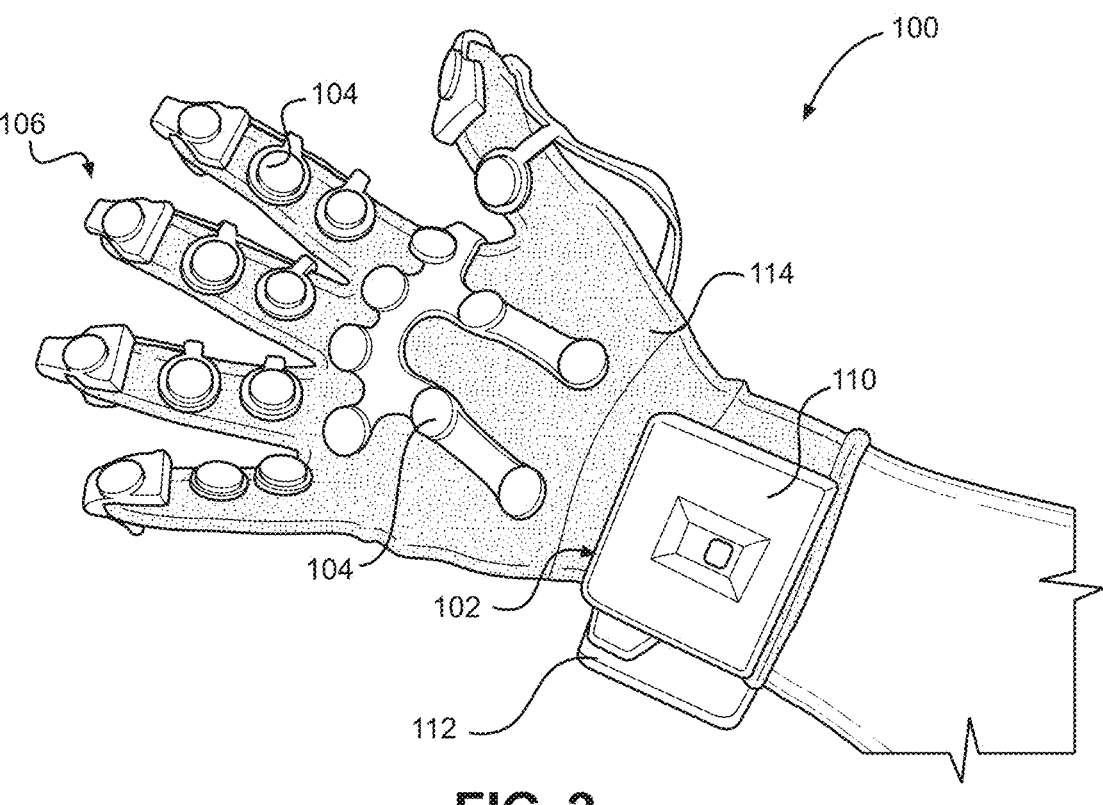
FIG. 2 illustrates a bottom perspective view of the haptic glove system.

FIG. 1 shows a top perspective view of a haptic glove system 100 according to aspects of this disclosure. FIG. 2 shows a bottom perspective view of the haptic glove system 100. The haptic glove system 100 can include a main body 102 that can support and/or house various aspects of the haptic glove system 100 and that can be contoured to an extremity of a user (e.g., a sheath, palm, hand, wrist, forearm, combinations thereof, among other possibilities). It is to be understood that the term "contoured" as used herein to describe an aspect of the haptic glove systems of the disclosure can mean that a size and shape of the aspect can be structured and arranged to correspond to the named anatomy of the user. It is further to be understood that the haptic glove system 100 can come in a variety of standard sizes (e.g., small, medium, large, etcetera) that are each respectively structured and arranged to fit users of different sizes. Alternatively, the haptic glove system 100 can be sized custom for a particular user. The term "contoured" can apply to either standard or custom sizes as would be readily understood by those of skill in the art.

The haptic glove system 100 can include a number of vibration motors 104 held in distributed locations throughout the haptic glove system 100. Vibration of the vibration motors 104 can provide vibrotactile haptic feedback, as described further later. In at least some embodiments, the vibration motors 104 can be coin-sized eccentric rotating mass motors. In at least some implementations, the vibration motors can run at up to 3V. Other types of vibration motors 104 are possible.

The haptic glove system 100 can include a number of sheaths 106 that can each be contoured to a respective finger of a user. Each of the sheaths 106 can provide at least two distinct forms of haptic feedback to a user. For example, the sheaths 106 can each include a number of the vibration motors 104 for vibrotactile feedback. The sheaths 106 can also be controlled to selectively resist closing of the fingers of the user to provide a second form of haptic feedback to the user, i.e., force feedback. For example, the haptic glove system 100 can include a number of resistance cables 108 and an actuator pack 110. The resistance cables 108 can connect the sheaths 106 to the actuator pack 110 and actuation of the actuator pack 110 can retract the resistance cables 108 to resist closing of the sheaths 106 and provide haptic force feedback for a user. The resistance cables 108 can be fixed using set screws, which can allow for adjustment of the resistance cables 108. Additionally, or alternatively, the resistance cables 108 can be crimped at various locations of the haptic glove system 100.

The haptic glove system 100 can further include a power supply, such as for example a battery 112 (e.g., a single cell 850 mAh lithium battery, among other possibilities). The battery 112 can power various electronic components of the haptic glove system 100.

The haptic glove system 100 can also include a liner 114. The liner 114 can be positioned between the main body 102 and the hand of a user to improve comfort of the haptic glove system 100 and/or to absorb sweat, oil, or other debris from the user. The liner 114 can be formed of a fabric (e.g., cotton, wool, polyester, combinations thereof, among other possibilities). The liner 114 can be either fixedly or removably attached to the main body 102. Removably attaching the liner 114 to the main body 102 can be advantageous in that it can facilitate certain cleaning procedures.

Figure 3:
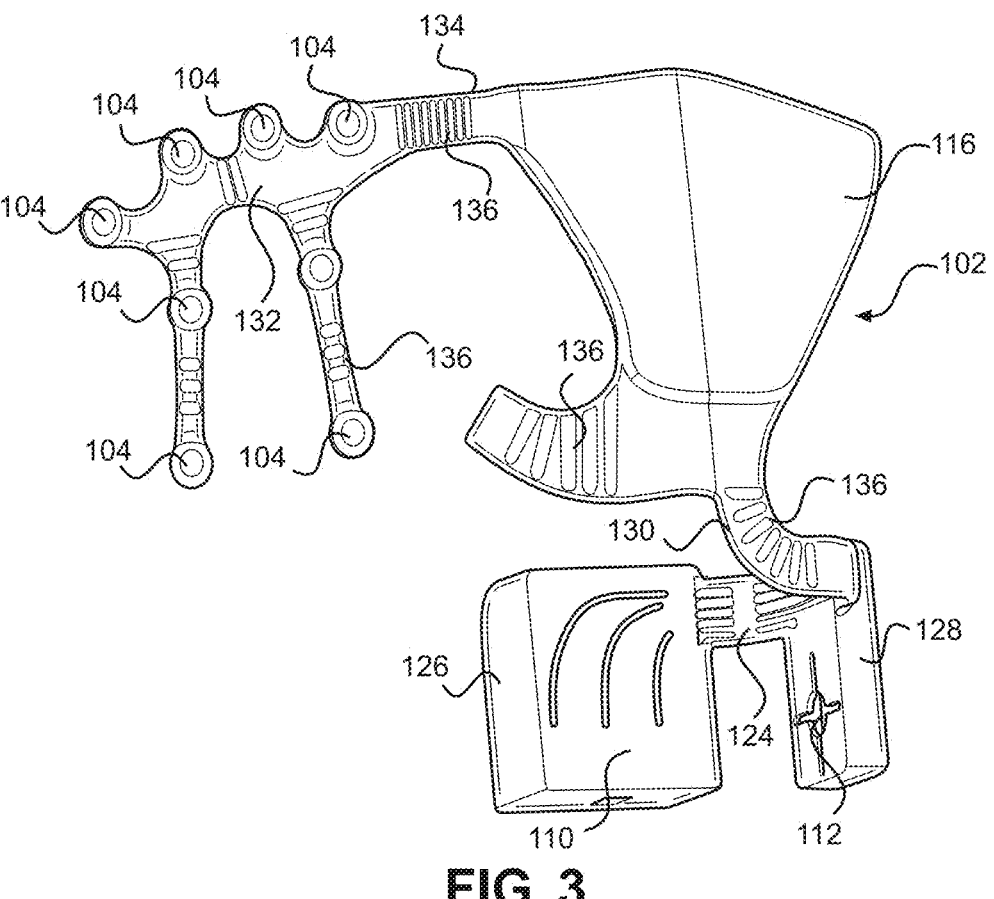
FIG. 3 illustrates a top perspective view of a main body of the haptic glove system.
Figure 4:
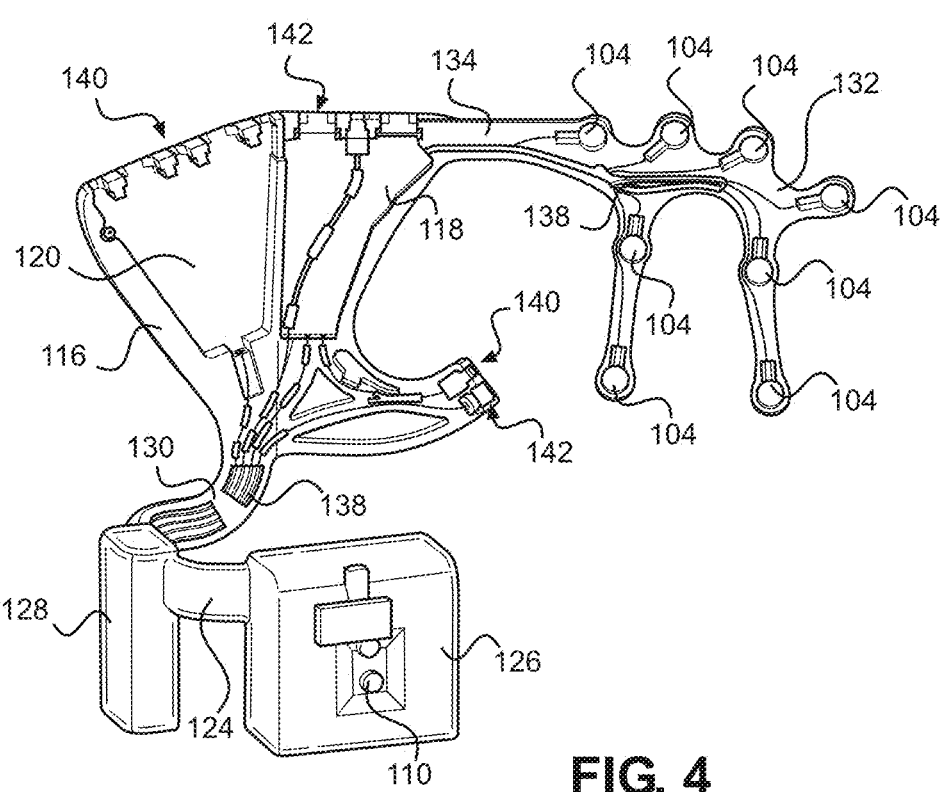
FIG. 4 illustrates a bottom perspective view of the main body of the haptic glove system.

FIG. 3 through FIG. 13 and the description associated therewith isolate aspects of the haptic glove system 100 for a clearer description of the isolated aspects. FIG. 3 shows a top perspective view of the main body 102. FIG. 4 shows a bottom perspective view of the main body 102. The main body 102 can be entirely or partially made of an elastic material. The elastic material can be thermoplastic polyurethane, thermoplastic elastomer, thermoplastic copolyester, thermoplastic polyamide, polypropylene, combinations thereof, among other possibilities. The main body 102 can be formed using any number of manufacturing techniques including molding, three-dimensional printing, among other possibilities.

The main body 102 can include a first portion 116. When the main body 102 is worn by the user, the first portion 116 can be positioned at the back of the hand of the user. The first portion 116 can be contoured to the hand of the user. For example, the first portion 116 can be contoured to the back of the hand of the user. As described herein elsewhere in greater detail, the first portion 116 can house various aspects of the haptic glove system 100 including resistance cables 108, electronics (e.g., aspects of the control system 1900 described later), a teeter 122 (described later), etcetera. For example, the first portion 116 can include a first recess 118 that can house aspects of the control system 1900 and aspects associated with haptic force control. In at least some embodiments, some aspects of the control system 1900 that can be housed in the first recess 118 can include one or more processors 1902, an array of connectors that connect the vibration motors 104 to the one or more processors 1902, drivers, transistor arrays, among other possibilities. The first portion 116 can include a second recess 120 that can house aspects associated with haptic force control, such as the teeter 122 and at least some of the resistance cables 108.

The main body 102 can include a second portion 124. When the main body 102 is worn by the user, the second portion 124 can be worn at and/or around the wrist of the user. The second portion 124 can be contoured to the wrist of the user. The second portion 124 can house the actuator pack 110 and/or the battery 112. For example, the second portion 124 can include an actuator pack housing 126 that houses the actuator pack 110 and can include a battery housing 128 that houses the battery 112. Since the second portion 124 can be worn at the wrist of the user, the second portion 124 can support the actuator pack 110 and/or the battery 112 at the wrist of the user. This can be advantageous for a number of reasons. For example, supporting the actuator pack 110 and/or the battery 112 at the wrist of the user can align the actuator pack 110 and/or the battery 112 with an axis of rotation of the wrist to reduce the overall travel and strain on the resistance cables 108 and/or on other electronics. This configuration can also reduce the overall bulkiness of the haptic glove system 100 by distributing components around the hand and wrist area.

The main body 102 can include a first bridge 130 that connects the second portion 124 to the first portion 116. The first bridge 130 can be as flexible or more flexible than each of the first portion 116 and the second portion 124 to minimize restriction of movement of the hand or wrist. For example, one or more dimension (e.g., a width or a thickness) of the first bridge 130 can be as narrow or narrower than a corresponding dimension of the first portion 116 and the second portion 124.

The main body 102 can include a third portion 132. When the main body 102 is worn by the user, the third portion 132 can be at a palm of the user. The third portion 132 can be contoured to the palm of the user. The third portion 132 can house one or more of the vibration motors 104, which can provide vibrotactile haptic feedback to the palm. In at least some embodiments, the third portion 132 can house eight vibration motors 104 distributed at regular or irregular intervals, though any number of vibration motors 104 are possible. The main body 102 can include a second bridge 134 that connects the third portion 132 to the first portion 116.

The main body 102 can include a number of relief cuts 136 distributed throughout the main body 102. The relief cuts 136 can increase the flexibility of the main body 102 as compared to regions of the main body 102 of similar thickness without relief cuts 136.

The main body 102 can include a number of channels 138 for housing and/or routing various components of the haptic glove system 100 including wiring for the control system 1900 and/or for the resistance cables 108. The channels 138 can be integral with the main body 102 and/or distinct structures fixed to the main body 102.

Figure 13:
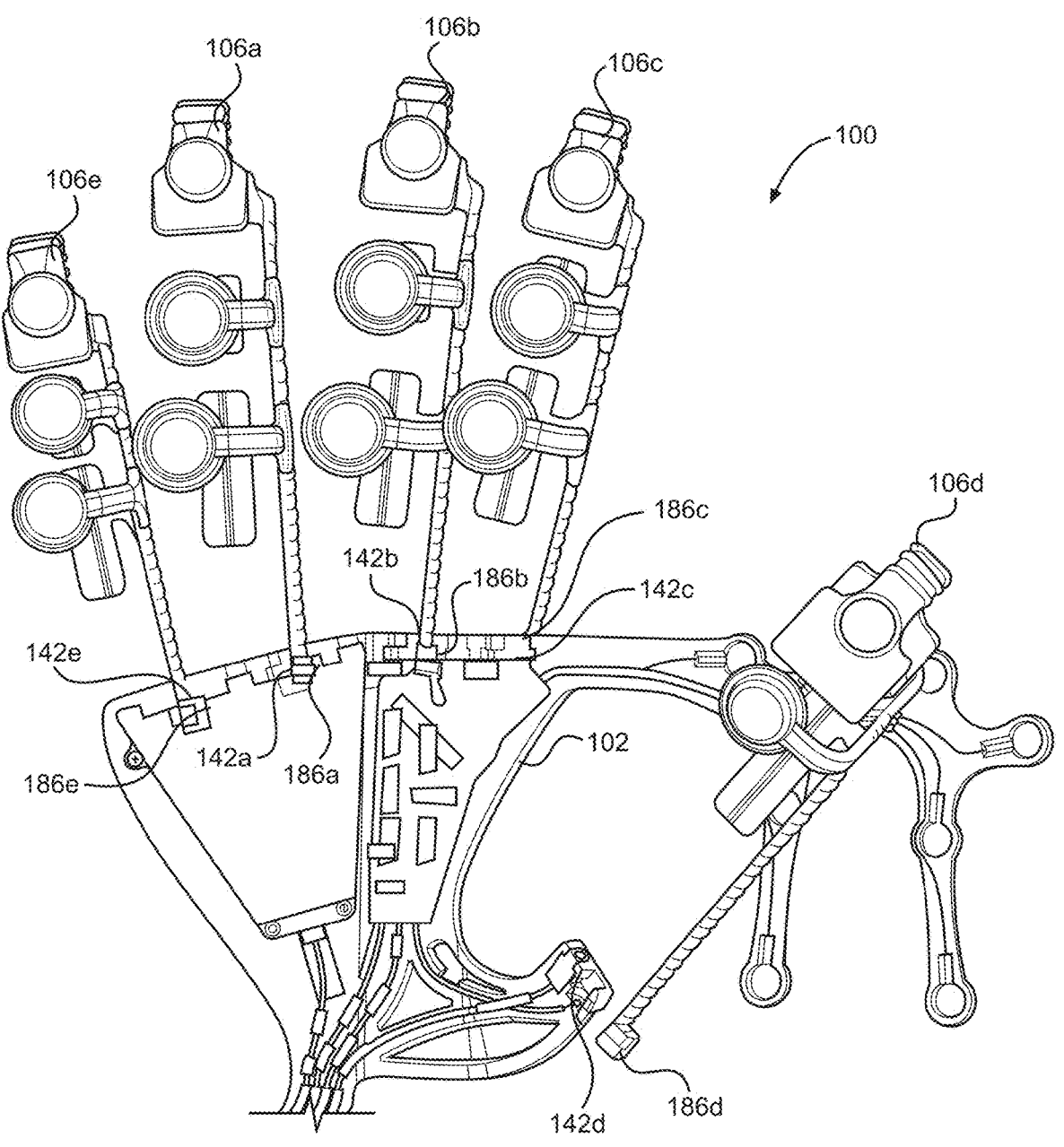
FIG. 13 illustrates connections for the main body and the sheaths of the haptic glove system.

The main body 102 can include a number of different guides 140. The guides 140 can route the resistance cables 108 between the main body 102 and the sheaths 106. The guides 140 can be integral with the main body 102 or can be distinct structures fixed to the main body 102. The main body 102 can include a number of different connectors 142, for example, one connector for each of the sheaths 106. The connectors 142 can be complementary to connectors of the sheaths 106 to mechanically connect the sheaths 106 to the main body 102, as shown in FIG. 13 and described further later. Mechanically connecting the sheaths 106 to the main body 102 can be advantageous in that it can relieve strain on resistance cables 108 or wiring extending between the sheaths 106 and the main body 102. The connectors 142 can be integral with the main body 102 or can be distinct structures fixed to the main body 102.

Figure 5:
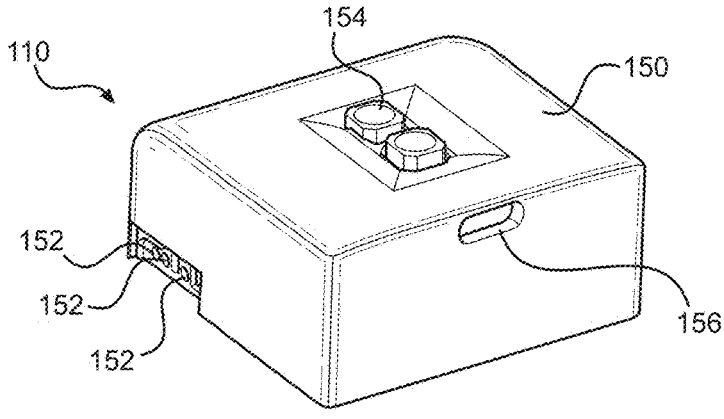
FIG. 5 illustrates a perspective view of an actuator pack of the haptic glove system.

FIG. 5 shows a perspective view of the actuator pack 110. The actuator pack 110 can include an actuator pack housing 150 that can completely or partially house any, some, or all of the aspects of the actuator pack 110 described herein. The actuator pack 110 can include resistance cable guides 152 that can guide the resistance cables 108 into/out of the actuator pack 110. The actuator pack 110 can include a human machine interface, HMI 154, which can allow the user to activate or control aspects of the haptic glove system

100. The HMI 154 can be embodied as one or more buttons, lights (e.g., LEDs), or as any of the aspects described later with respect to the HMI 1908. The HMI 154 can be accessible through the actuator pack housing 150. The actuator pack 110 can include an input/output, I/O 156, which can allow the haptic glove system 100 to interface with external systems, components, charging outlets, among other possibilities. The I/O 156 can be embodied as a universal serial port (e.g., a USB-C port) or as any of the aspects described later with respect to the I/O 1910.

Figure 6:
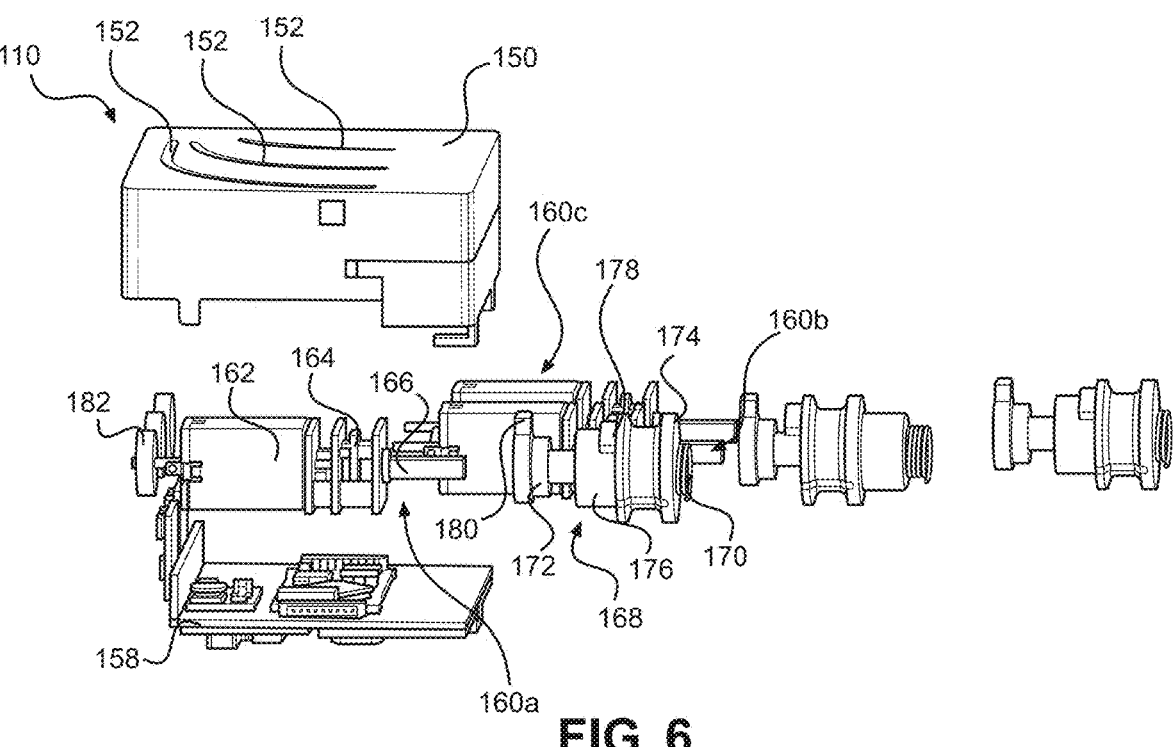
FIG. 6 illustrates an exploded view of the actuator pack.

FIG. 6 shows an exploded view of the actuator pack 110. The actuator pack 110 can include an actuator pack controller subsystem 158. The actuator pack controller subsystem 158 can include aspects of the control system 1900. For example, the actuator pack controller subsystem 158 can include a microcontroller, a radio (e.g., Bluetooth radio), an antenna, power regulators, a battery charger, monitor, motor controllers, etcetera. In at least some embodiments, the actuator pack controller subsystem 158 can be solely dedicated to control of the actuator pack 110 and can receive instructions for control of the actuator pack 110 from other aspects of the control system 1900. Alternatively, the actuator pack controller subsystem 158 can be a part of the control system 1900 and can be involved with aspects of control of the haptic glove system 100 beyond just controlling the actuator pack 110 including for example control of the vibrotactile haptic feedback.

The actuator pack 110 can include a first actuator 160a, a second actuator 160b, and a third actuator 160c, though it is to be understood that the actuator pack 110 can include fewer or more than three actuators. The first actuator 160a, the second actuator 160b, and the third actuator 160c can be substantially similar to each other. Aspects of the first actuator 160a will be described in detail as follows, but it is to be understood that because the first actuator 160a, the second actuator 160b, and the third actuator 160c can be substantially similar to each other, each of the second actuator 160b and the third actuator 160c can also include any, some, or all of the features described in detail with respect to the first actuator 160a.

The first actuator 160a can include a motor 162, gears 164, and an output shaft 166. The motor 162 can drive gears 164 that can in turn rotate the output shaft 166. The first actuator 160a can further include a spindle 168 that can be coupled to the output shaft 166. The spindle 168 can be operatively connected (e.g., wound around and/or fixed to) an end of a respective one of the resistance cables 108. A respective one of the resistance cable guides 152 can route the respective one of the resistance cables 108 to the spindle 168 of the first actuator 160a. Actuation of the first actuator 160a can cause the motor 162 to rotate, which can turn the gears 164, rotate the output shaft 166, and cause the spindle 168 to reel in the respective one of the resistance cables 108 to resist closing of the respective one or more of the sheaths 106 connected thereto.

The spindle 168 can include a spring 170. The spindle 168 can further include an inner portion 172 that can be rotationally fixed to the output shaft 166 and an outer portion 174 that can be rotatable within a predefined angular range with respect to the inner portion 172. When the motor 162 is deactivated, the outer portion 174 can rotate independently from the inner portion 172. When the motor 162 is activated, the outer portion 174 can rotate together with the inner portion 172. The spindle 168 can include a bushing 176 between the inner portion 172 and the outer portion 174 to reduce friction between the inner portion 172 and the outer portion 174. The spring 170 can bias the outer portion 174 towards a retracted position with respect to the inner portion 172. In the retracted position, an outer portion stop 178 of the outer portion 174 can abut against an inner portion stop 180 of the inner portion 172. Abutment of the inner portion stop 180 and the outer portion stop 178 can allow the inner portion 172 to transfer rotational force from the motor 162 to the outer portion 174 and thereby generate force feedback at the respective one or more of the sheaths 106 connected thereto. Because the outer portion 174 can rotate with respect to the inner portion 172 (e.g., the outer portion stop 178 can rotate within an angular range away from the inner portion stop 180), the respective one or more of the sheaths 106 connected to the outer portion 174 can overcome the biasing force applied by the spring 170 and move substantially freely when the force feedback is not applied. The biasing force imparted by the spring 170 can be sufficient to reel in slack of the respective one of the resistance cables 108, but not substantially more than necessary to reel in the slack so as not to overly resist free movement of the one or more of the sheaths 106 and fingers therein. In at least some embodiments, one full rotation of the spindle 168 can substantially equal to one full stroke length of the respective one or more sheaths 106. For example, the one or more sheaths 106 can move one full stroke length between an open configuration and a closed configuration and one full rotation of the spindle 168 can corresponds to the one full stroke length. The respective one of the resistance cables 108 can be reeled in and out from around the outer portion 174 of the spindle 168 when the respective one of the one or more sheaths 106 moves the one full stroke length from the open configuration to the closed configuration. This can be advantageous in that the motor 162 can control the range of motion within a single rotation, which can simplify control and allow the inner portion 172 of the spindle 168 to remain stationary until force feedback is initiated.

The first actuator 160a can further include an encoder 182 or other sensor that can directly or indirectly sense an angular position of the output shaft 166. In at least some embodiments, the first actuator 160a can include a second encoder or other second sensor that can directly or indirectly sense an angular position of the spindle 168 (e.g., an angular position of the outer portion 174). The control system 1900 can use the angular position of the output shaft 166 and/or of the spindle 168 to accurately control force feedback exerted on the one or more sheaths 106 by the first actuator 160a.

Figure 7:
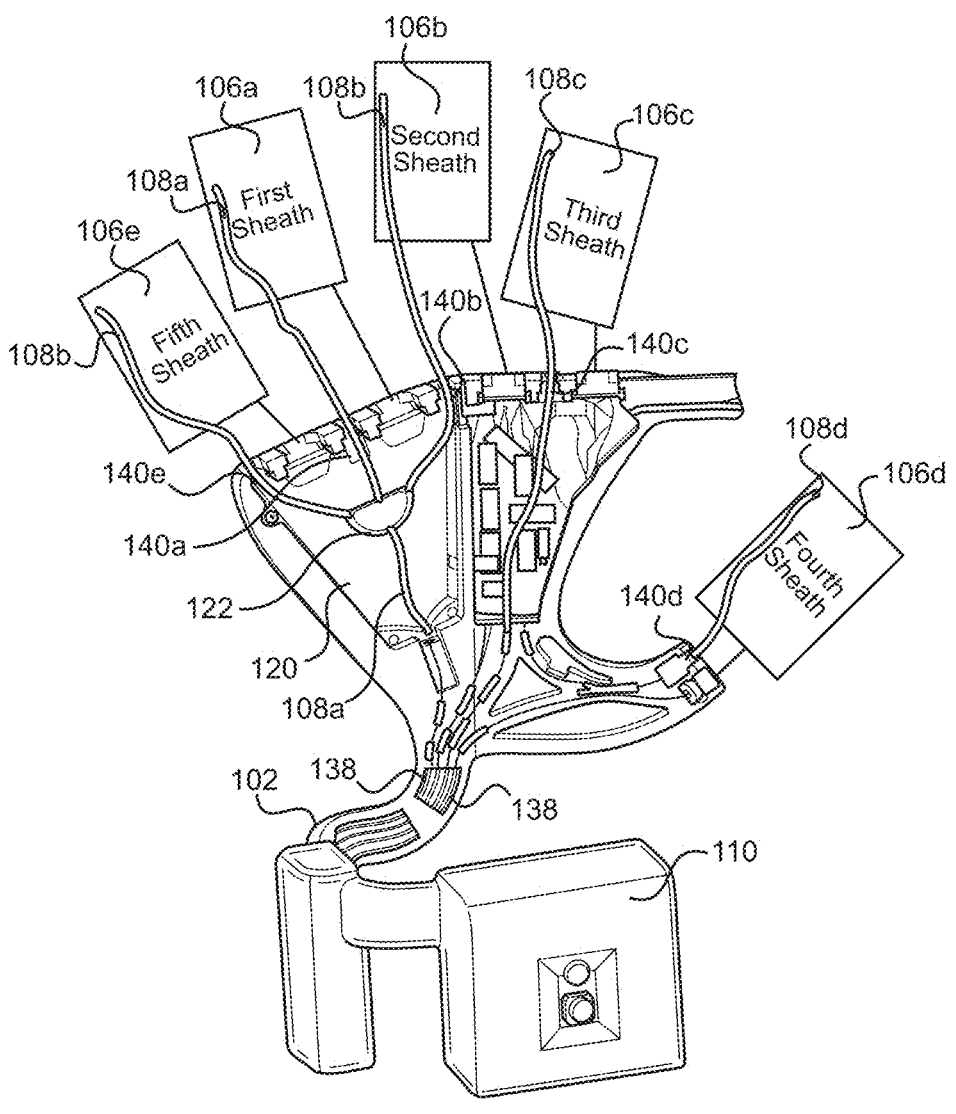
FIG. 7 illustrates a schematic view of the haptic glove system including aspects directed to actuation of resistance cables of the haptic glove system.

FIG. 7 shows a schematic view of the haptic glove system 100 including aspects directed to actuation of the actuator pack 110 that can cause the haptic force feedback. The haptic glove system 100 can include any number of sheaths 106. For example, the haptic glove system 100 can include a first sheath 106a, a second sheath 106b, a third sheath 106c, a fourth sheath 106d, and a fifth sheath 106e. In at least some embodiments, the haptic glove system 100 can include less than five sheaths 106. For example, embodiments of the haptic glove system 100 can be provided without the fifth sheath 106e. The sheaths 106 can be contoured to correspond to different fingers of a user. For example, the first sheath 106a can be contoured to a ring finger, the second sheath 106b can be contoured to a middle finger, the third sheath 106c can be contoured to an index finger, the fourth sheath 106d can be contoured to a thumb, and the fifth sheath 106e can be contoured to a pinky.

As described previously, the haptic glove system 100 can control a resistance applied to the sheaths 106 to resist closing of the sheaths 106 and thereby provide haptic force feedback to fingers within the respective sheaths 106. For example, each of the sheaths 106 can be connected to the actuator pack 110 via the resistance cables 108 and actuation of the actuator pack 110 can cause the haptic force feedback.

As described previously, the actuator pack 110 can include a number of actuators that can independently control the resistance applied to one or more of the sheaths 106. In at least some aspects, the actuator pack 110 can include fewer actuators than sheaths 106 such that at least one of the actuators can control the resistance of two or more of the sheaths 106. For example, the haptic glove system 100 can include a first resistance cable 108a that couples the first sheath 106a to the first actuator 160a. The first resistance cable 108a can be threaded through a first guide 140a of the main body 102. The haptic glove system 100 can include a teeter 122 fixedly coupled to the first resistance cable 108a within the main body 102, for example, within the second recesses 120 of the main body 102. The teeter 122 can be crimped to the first resistance cable 108a, though other techniques of fixing the teeter 122 to the first resistance cable 108a are possible.

The haptic glove system 100 can further include a second resistance cable 108b that connects the teeter 122 to the second sheath 106b. The second resistance cable 108b can be threaded through a second guide 140b of the main body 102. In at least some embodiments, an end of the second resistance cable 108b can be fixedly connected (e.g., crimped) to the second sheath 106b. In at least some embodiments the second resistance cable 108b can be slidably connected to the teeter 122. For example, and as shown in FIG. 7, the second resistance cable 108b can be threaded through the teeter 122. One end of the second resistance cable 108b can be connected to the second sheath 106b and the other end of the second resistance cable 108b can be connected to the fifth sheath 106e. In at least some implementations, the second resistance cable 108b can be threaded through a fifth guide 140e of the main body 102. Because the teeter 122 is fixed to the first resistance cable 108a, actuation of the first actuator 160a can retract the first resistance cable 108a and the teeter 122 fixed thereto. The teeter 122 can in turn retract the second guide second resistance cable 108b and thereby apply resistance to the second sheath 106b and, in at least some implementations, to the fifth sheath 106e as well. The teeter 122 can be movable, at least to some degree, in all directions (i.e., right, left, up, down, forward, and backward). This can allow for independent and uninhibited movement of each of the sheaths 106 (e.g., the first sheath 106a, the second sheath 106b, and/or the fifth sheath 106e) connected to the teeter 122 when haptic force feedback is not applied.

The second actuator 160b can be connected to the third sheath 106c via a third resistance cable 108c. The third resistance cable 108c can be threaded through a third guide 140c of the main body 102. The second actuator 160b can retract the third resistance cable 108c to apply resistance to the third sheath 106c. The second actuator 160b can be controlled independently of the first actuator 160a. Accordingly, resistance can be applied to the third sheath 106c (via the second actuator 160b and the third resistance cable 108c) independently of any, some, or all of the other sheaths 106.

The third actuator 160c can be connected to the fourth sheath 106d via a fourth resistance cable 108d. The fourth resistance cable 108d can be threaded through a fourth guide 140d of the main body 102. The third actuator 160c can retract the fourth resistance cable 108d to apply resistance to the fourth sheath 106d. The third actuator 160c can be controlled independently of the first actuator 160a and the second actuator 160*b*. Accordingly, resistance can be applied to the fourth sheath 106*d* (via the third actuator and the fourth resistance cable 108*d*) independently of any, some, or all of the other sheaths 106.

Figure 8:
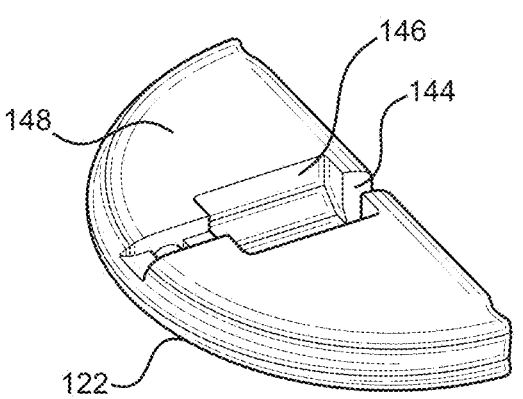
FIG. 8 illustrates a transparent view of a teeter of the haptic glove system.

FIG. 8 shows a transparent perspective view of the teeter 122. The teeter 122 can have a semicircular shape, though other shapes are possible. The teeter 122 can include a first passage 144 that the first resistance cable 108*a* can be routed through. The first passage 144 can include a receptacle 146 that can accommodate a fastener (e.g., a crimp) to fixedly connect the teeter 122 to the first resistance cable 108*a* such that the teeter 122 moves together with the first resistance cable 108*a*, as previously described. As shown in FIG. 7, the first passage 144 and the receptacle 146 can be open, which can allow the first resistance cable 108*a* to be pressed into the first passage 144 and the receptacle 146. The teeter 122 can further include a second passage 148 that the second resistance cable 108*b* can be routed through. The second passage 148 can be U-shaped, though other shapes are possible. The second passage 148 can be completely or partially offset from the first passage 144. This can allow the first resistance cable 108*a* to be routed through the first passage 144 and the second resistance cable 108*b* to be routed through the second passage 148 without interference with each other.

Figure 9:
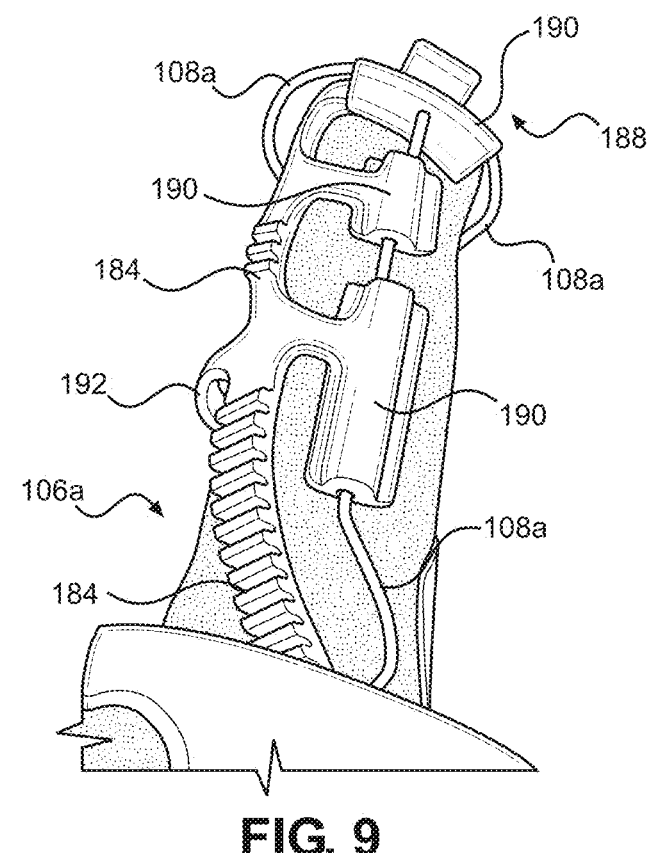
FIG. 9 illustrates a sheath of the haptic glove system in an extended position.
Figure 10:
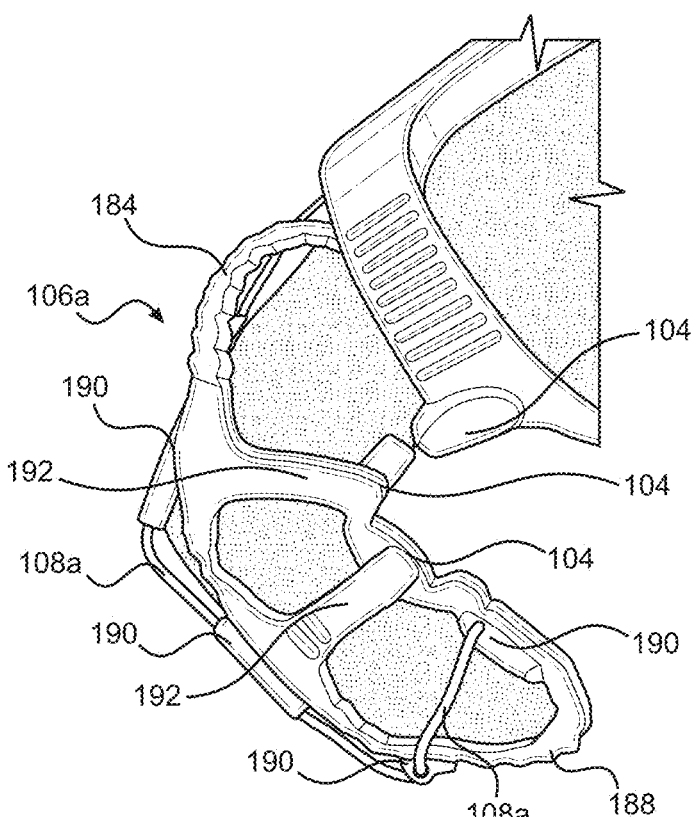
FIG. 10 illustrates the sheath of the haptic glove system in a retracted position.
Figure 12:
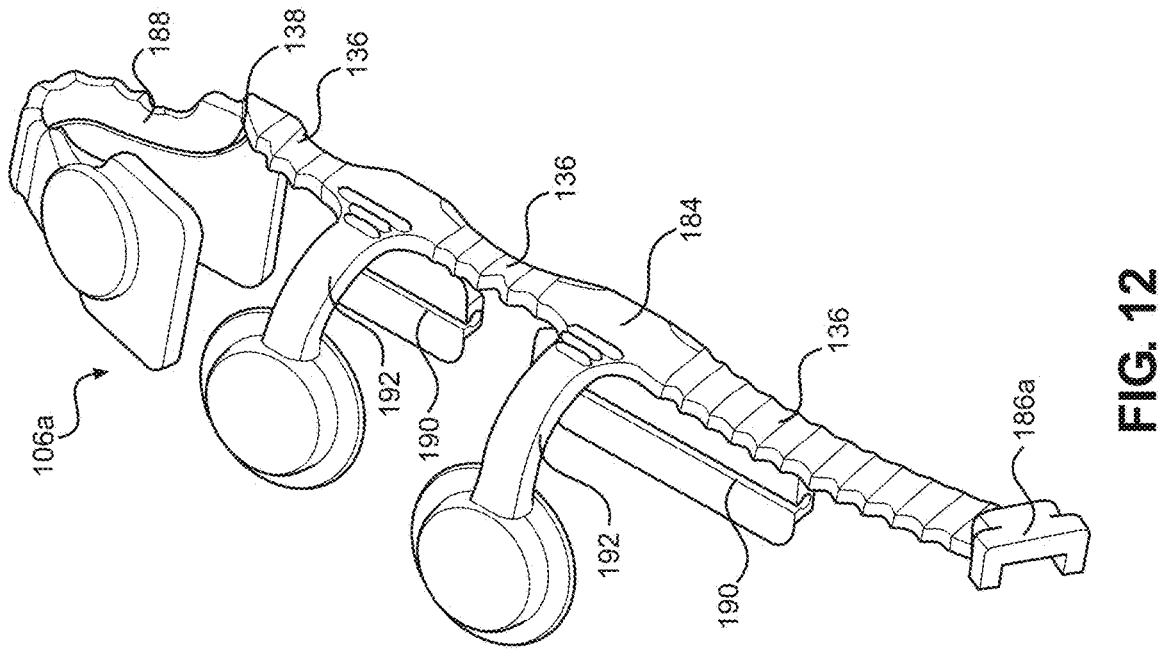
FIG. 12 illustrates a bottom perspective view of the aspects of the sheath.
Figure 11:
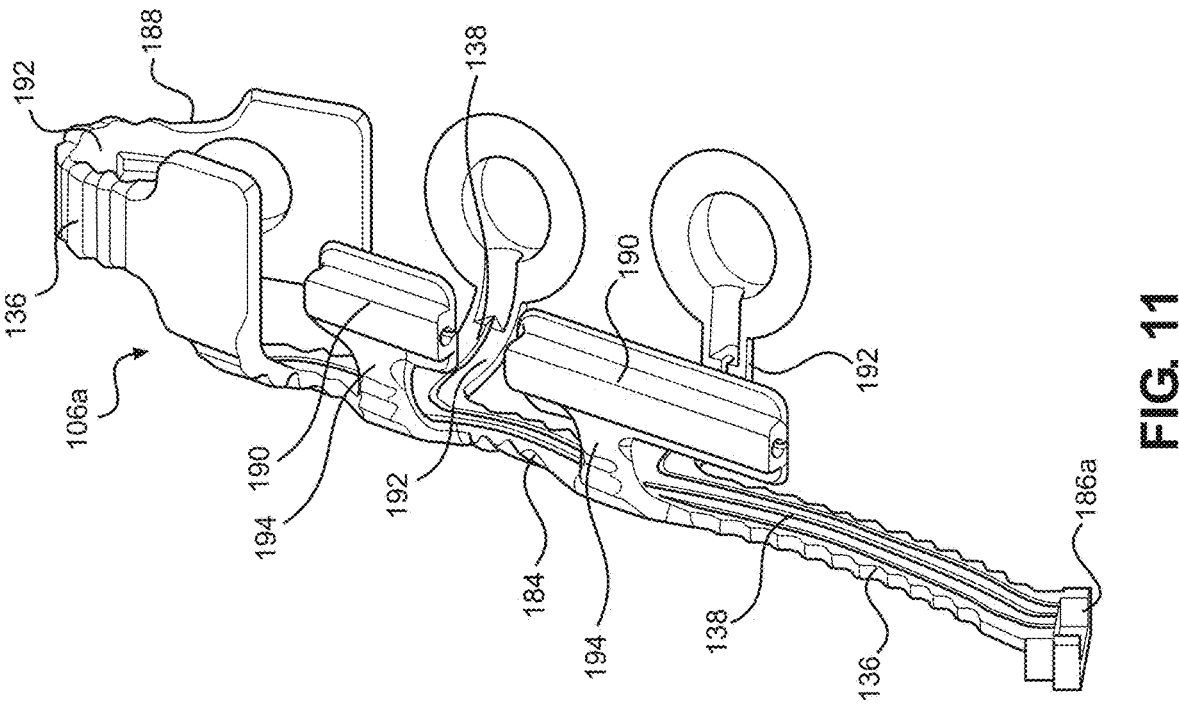
FIG. 11 illustrates a top perspective view of aspects of the sheath.

FIG. 9 through FIG. 12 and the related description thereof are directed to aspects of the first sheath 106*a*. FIG. 9 shows the first sheath 106*a* in an extended position. FIG. 10 shows the first sheath 106*a* in a retracted position. FIG. 11 shows a top perspective view of aspects of the first sheath 106*a* in the extended position. FIG. 12 shows a bottom perspective view of aspects of the first sheath 106*a* in the extended position. It is be understood that any of the other sheaths of the haptic glove systems described herein (e.g., the second sheath 106*b*, the third sheath 106*c*, the fourth sheath 106*d*, and/or the fifth sheath 106*e*) can each include any, some, or all of the features, structures, or relationships described as follows with respect to the first sheath 106*a*. However, the sizes of at least some of the other sheaths can differ with respect to the first sheath 106*a* and/or with respect to each other to accommodate different fingers, as described previously.

The first sheath 106*a* can include a first support 184. The first support 184 can be contoured to at least part of a finger (e.g., a ring finger) of a user. For example, and as shown in FIG. 10, the first support 184 can have arcuate segments. The arcuate segments can extend between finger segments adjacent to the respective finger joints when the haptic glove system 100 is worn be a user. This can be advantageous by reducing concentrated strain regions on wiring running through the first sheath 106*a* and can provide flexibility and adjustment for different hand sizes. The first support 184 can include a first connector 186*a*, which can be complementary to the first connector 142*a* of the main body 102 for mechanically connecting the first sheath 106*a* to the main body 102. In at least some embodiments, the first connector 186*a* can be a male T-shape and the first connector 142*a* can be a female T-shape, though other complementary connectors types are possible.

The first sheath 106*a* can include a tip 188 at distal end of the first support 184. The tip 188 can be substantially C-shaped with the opening of the C-shaped facing proximally. According to this configuration, when the haptic glove system 100 is worn by a user the tip 188 can accommodate and wrap around a fingertip of the user. The tip 188 can support at least one of the vibration motors 104, for example, within a recess of the tip 188. When the haptic glove system 100 is worn by a user, the tip 188 can support one of the vibration motors 104 on a pad of the fingertip. The tip 188 can include one or more resistance cable guides 190. In at least some aspects, the one or more resistance cable guides 190 can route the first resistance cable 108*a* circumferentially around the tip 188, as shown in FIG. 9 and FIG. 10. In at least some embodiments, an end of the first resistance cable 108*a* can be fixed to the tip 188 and the first resistance cable 108*a* can be routed circumferentially around the tip 188. According to this configuration, when the first resistance cable 108*a* is retracted by the actuator pack 110 the first resistance cable 108*a* can squeeze the tip 188 providing enhanced haptic force feedback. The tip 188 can be resiliently biased in an open configuration such that the tip 188 can automatically revert to the open configuration after the squeeze force exerted by the first resistance cable 108*a* is released.

The first sheath 106*a* can include one or more second supports 192. The second supports 192 can extend generally orthogonally from the first support 184. The second supports 192 can have an arcuate shape. The second supports 192 can each support at least one of the vibration motors 104, for example, within a recess of the respective second support 192. When the haptic glove system 100 is worn by a user, the second supports 192 can each support one of the vibration motors 104 on respective pad of a finger of the user.

The first sheath 106*a* can include one or more third supports 194. The third supports 194 can extend generally orthogonally from the first support 184. In at least some embodiments, the third supports 194 can each respectively oppose one of the second supports 192. The third supports 194 can have an arcuate shape. The third supports 194 can each support a respective resistance cable guide 190. When the haptic glove system 100 is worn by a user, the third supports 194 can support the respective resistance cable guide 190 on the back of a segment of a finger of the user.

Aspects of the first sheath 106*a* can be formed of the same (or substantially the same) material as the material forming the main body 102. For example, the first support 184, the first connector 186*a*, the tip 188, the resistance cable guides 190, the second supports 192, and/or the third supports 194 can be formed of an elastic material. In at least some embodiments, the elastic material can have a shore hardness of between about 70-80a, though other shore hardnesses are possible. The elastic material can be thermoplastic polyurethane, thermoplastic elastomer, thermoplastic copolyester, thermoplastic polyamide, polypropylene, combinations thereof, among other possibilities. The first support 184, the first connector 186*a*, the tip 188, the resistance cable guides 190, the second supports 192, and/or the third supports 194 can be formed using any number of manufacturing techniques including molding, three-dimensional printing, among other possibilities. Each, some, or all of the first support 184, the first connector 186*a*, the tip 188, the resistance cable guides 190, the second supports 192, and the third supports 194 can be integral with each other. Each, some, or all of the first support 184, the first connector 186*a*, the tip 188, the resistance cable guides 190, the second supports 192, and/or the third supports 194 can include relief cuts 136 and/or channels 138 for routing electronics such as wiring.

FIG. 13 shows a view of the mechanical connections for the main body 102 and the sheaths 106. As shown, the main body 102 can include a first connector 142*a*, a second connector 142*b*, a third connector 142*c*, a fourth connector 142*d*, and a fifth connector 142*e* that can respectively connect to one of the first connector 186*a* of the first sheath 106a, the second connector 186b of the second sheath 106b, the third connector 186c of the third sheath 106c, the fourth connector 186d of the fourth sheath 106d, and the fifth connector 186e of the fifth sheath 106e.

FIG. 14 through FIG. 18 show views of another haptic glove system 200 according to aspects of this disclosure. Except for the express differences described as follows, the haptic glove system 200 can include each of the features, structures, relationships, etcetera described previously with respect to the haptic glove system 100.

The electronics, battery, motors, and/or tendon routing of the haptic glove system 200 can be consolidated into a compact back-of-hand architecture (e.g., with a maximum height of about a half an inch). The resistance cables can be arranged within the main body that rests on the back of the hand in a first layer, and electronics can be stacked above that layer. The main body of the haptic glove system 200 can be positioned at the back of a hand of the user between knuckles and a wrist of the user when the haptic glove system is worn by the user. The main body can project a maximum amount (e.g., about a half an inch) outwardly away from the back of the hand of the user when the haptic glove system 200 is worn by the user. This can be advantageous in that the haptic glove system 200 can maintain a low profile while still accommodating both the resistance cables and the electronics within the same general region of the main body. The low profile can be advantageous in that the hand of a user wearing the haptic glove system 200 can be more easily recognized by optical hand tracking systems since the haptic glove system 200 does not significantly alter the shape and appearance of the hand.

At least some of the motors and/or spindles of the haptic glove system 200 can be oriented inverted and/or offset relative to one another. This can provide direct, low-friction exits into integrated channels of the main body to achieve efficient routing and to further enable to compact, low profile design. The haptic glove system 200 can include integrated low-friction channels for efficient resistant cable routing. In at least some aspects, the channels can be integrally formed in the main body.

In at least some aspects, the pinky sheath may be free from any resistance cables, which can reduce complexity and improve manufacturability.

In at least some embodiments, at least some of the resistance cables can be connected together in a Y-shape, for distributing tensile load to two fingers. In at least some aspects, the Y-shape can be formed by tying two or more resistance cables together in a knot, such as an Albright knot. The Y-shape can be positioned within a recess in the main body, which can allow for limited lateral and/or vertical movement of the Y-shape within the recess of the main body. This can be advantageous in that it can preserve independent motion of fingers while still delivering coupled resistance when force is applied by the actuator.

In at least some aspects, the spindles of the actuator can be free from springs. In such aspects, the slack in the resistance cables can be managed by the channel geometry and/or by an outer glove that covers sheaths and main body. This can be advantageous in reducing complexity of the haptic glove system 200 and in improving manufacturability.

The haptic glove system 200 can include an electronics architecture employing a primary rigid PCB, a motor/encoder flex that mates via a board-to-board connector, and/or a separate flex harness for the vibration motors. In at least some embodiments, the vibration-motor flex can include metal stiffeners that can manage bend locations to maintain flat, well-supported spans between level changes of the back-of-hand structure. Bulk electronic components such as inductors, a USB-C connector, a button, and an RGB LED can be concentrated in one or more recessed regions of the main body. One recessed region may be adjacent to the region that accommodates the Y-shaped resistance cables, which can reduce the heigh of the main body by improving the compactness of the main body.

In at least some aspects, the main PCB of the electronics can be symmetric, which can allow the same PCB architecture to be implemented for both right-hand and left-hand implementations of the haptic glove system 200. In at least some implementations, the main PCB of the electronics can include two battery connectors. In use, one of the two connectors can be connected to the battery of the haptic glove system 200 while the other of the two connectors is disconnected. This can further support implementation of the same PCB architecture for both right-hand and left-hand implementations of the haptic glove system 200, where one of the battery connectors can be for the right-hand implementation and the other can be for the left-hand implementation.

Aspects of the haptic glove system 200 can provide several advantages. Consolidating components on the back of the hand and stacking the Y-shaped connected resistance cables beneath the electronics can lower the profile and distribute mass to achieve a slim form factor that remains within native hand-tracking tolerances of XR headsets, thereby avoiding external trackers, beacons, or strapped-on controllers. The motor/spindle layout, together with integrated low-friction routing, can reduce friction, complexity, and height, while enabling direct tendon paths and reliable operation. The junction of the Y-shaped connected resistance cables can preserve independent finger movement for the two coupled fingers while allowing one actuator to serve both, reducing parts and volume. Simplified spindles can mitigate slack-related pinch concerns, leveraging the glove geometry and textile containment rather than spring-loaded take-up. The flex/stiffener PCB strategy can control bend locations, reduce connector count and Z-stacking, and route signals in minimal volume. The symmetric PCB can streamline manufacturing for left/right variants. Overall, the arrangement can produce a lightweight glove that can be put on and taken off, that is aesthetically consistent with a human hand under vision systems, and that integrates vibrotactile and force feedback with reduced bulk and improved manufacturability. These and other aspects of the haptic glove system 200 are shown in FIG. 14 through FIG. 17 and described further as follows.

Figure 14:
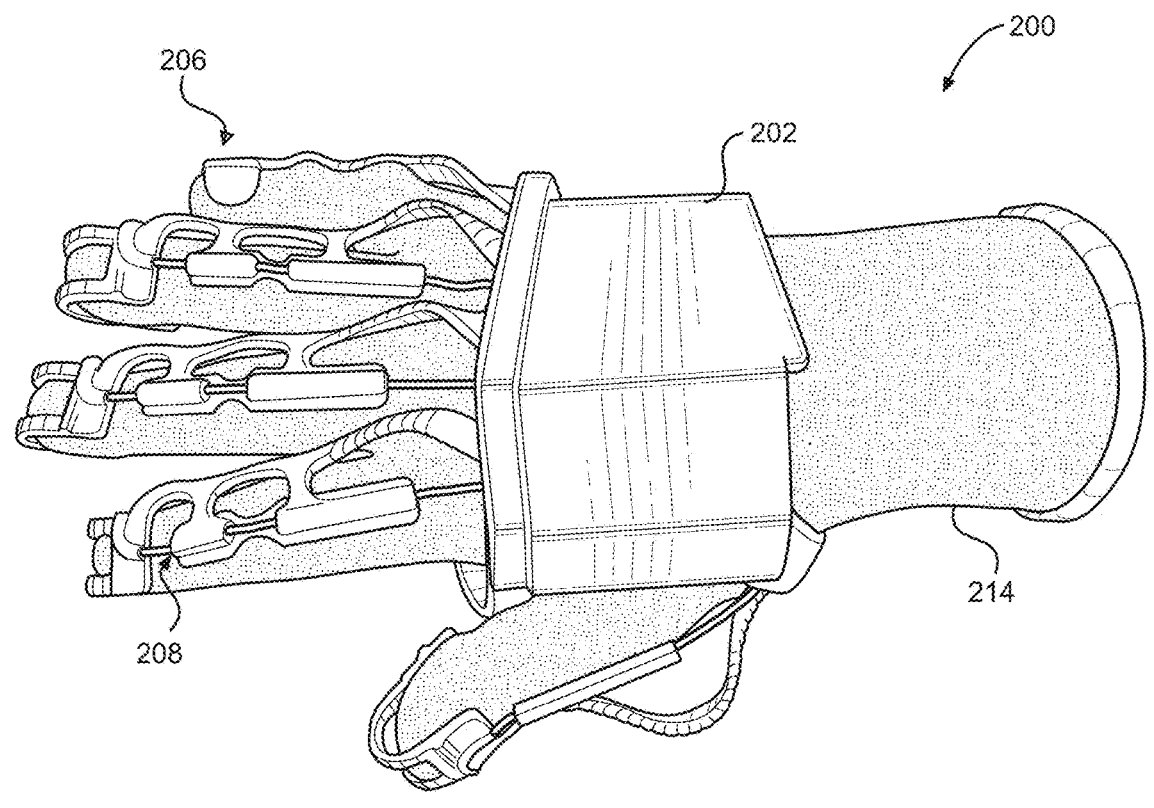
FIG. 14 illustrates a top perspective view of another haptic glove system according to aspects of this disclosure.

FIG. 14 shows a top view of the haptic glove system 200. The haptic glove system 200 can include a main body 202 that supports and/or houses various aspects of the haptic glove system 200 and that is contoured to an extremity of a user. Except where expressly indicated to the contrary, the main body 202 can include each of the features, structures, relationships, etcetera described previously with respect to the main body 102. The main body 202, when worn by a user, can be secured comfortably against the hand while positioning and protecting internal components. The actuator pack and the battery can be integrated together with the electronics into the main body 202, rather than being held on a separate wrist structure. Integrating the actuator pack and the battery into the main body 202 can reduce bulk and can concentrate mass over the back of the hand to improve comfort, balance, and routing of cables and electronics.

The main body 202 can include the first portion (e.g., a back of hand portion) contoured to the back of the hand, and the third portion (e.g., a palm portion) contoured to the palm, described previously. Because the actuator pack and battery can be together with the electronics into the main body 202, the previously described second portion and first bridge can be omitted from the haptic glove system 200. The first portion can house or shield aspects of the control and actuation subsystems and can include recesses and channels that receive, protect, and route electronics, conductors, and resistance cables 208, as described previously. The third portion can support the vibration motors 204 positioned to provide vibrotactile feedback to the palm, as described previously. The main body 202 can include relief cuts that increase flexibility relative to regions of similar thickness without such features and can further include a number of different guides arranged to route the resistance cables 208 between the main body 202 and sheaths 206, as described previously.

The vibration motors 204 can be held in the main body 202 and in the sheaths 206 at locations selected to provide localized vibrotactile sensations at the palm, fingertips, and along finger segments, as described previously. The vibration motors 204 can include each of the features, structures, relationships, etcetera described previously with respect to the vibration motors 104.

The haptic glove system 200 can further include the plurality of sheaths 206 that are each contoured to a respective finger, as described previously. The sheaths 206 can include each of the features, structures, relationships, etcetera described previously with respect to the sheaths 106. Each sheath 206 can provide vibrotactile and force feedback. For vibrotactile feedback, the sheaths 206 can carry some of the vibration motors 204 on structures that position the motors against the finger pads when worn by a user. For force feedback, each sheath 206 can be operatively connected to the actuator pack via one or more of the resistance cables 208 routed through the main body 202, as described previously. The sheaths 206 can be mechanically connected to the main body 202 via complementary connectors to reduce strain on the resistance cables 208 and wiring, as described previously.

The sheaths 206 can include the first support contoured to at least part of a side of a finger, the plurality of second supports that can each carry a vibration motor 204 toward a respective finger pad, and the plurality of third supports that can carry guides to route the resistance cables 208 along the backs of the finger segments, as described previously. Each sheath 206 can further include the tip 288 at a distal end that is configured to receive a fingertip and that can be circumferentially routed with a resistance cable 208 so that retraction of the resistance cable 208 squeezes the tip to augment force feedback, as described previously. The tip 288 can include a first hinge 288a and a second hinge 288b disposed on opposing sides and defining a space therebetween. This can be advantageous in that the tip 288 can squeeze a finger of a user when force is applied by the actuator pack 210, while the space can leave aspects of the fingertip exposed. Leaving the fingertip exposed can allow a user to more easily manipulate their surroundings, including making it easier to access the on/off button of the haptic glove system 200. The tip 288 can be resiliently biased in the open configuration such that the tip 288 can automatically revert to the open configuration after the squeeze force exerted by the resistance cable 208 is released, as previously described.

The resistance cables 208 can connect the sheaths 206 to the actuator pack integrated within the main body 202. The resistance cables 208 can include each of the features, structures, relationships, etcetera described previously with respect to the resistance cables 108. The resistance cables 208 can be threaded through the guides of the main body 202 and the sheaths 206 and through channels and recesses within the main body 202. Retraction of one or more of the resistance cables 208 by the actuator pack can resist closing of the sheaths 206 to provide controllable haptic force feedback. In certain implementations, a portion of the resistance cables 208 can be routed around the tips of the sheaths 206 so that retraction produces a squeezing effect at the fingertips in addition to restricting finger closure, as previously described. The routing arrangements can leverage the integrated architecture of the main body 202 to reduce bends and length, which can lower friction and improve responsiveness.

Figure 15:
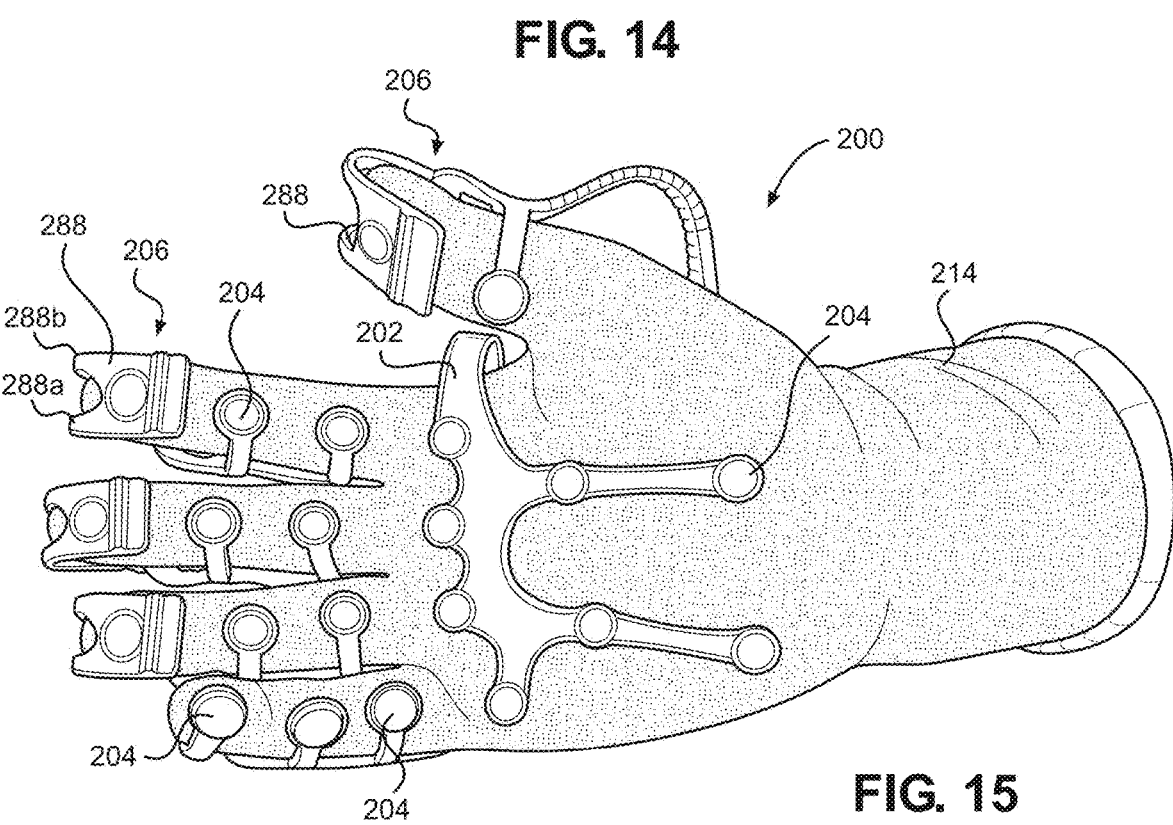
FIG. 15 illustrates a bottom perspective view of the other haptic glove system.

FIG. 15 shows a bottom view of the haptic glove system 200. From this perspective, the arrangement of the main body 202 relative to the palm, the distribution of vibration motors 204 in the palm region, the mechanical interfaces to the sheaths 206, and the routing of the resistance cables 208 toward the integrated actuator pack are visible.

As described previously, the third portion of the main body 202 can be contoured to the palm and can house a plurality of the vibration motors 204 distributed to provide localized vibrotactile feedback across the palm. The third portion can be formed of a material is comfortable to wear comfort and that is sufficiently compliant, while also maintaining sufficient structural integrity to support the vibration motors 204.

Figure 16:
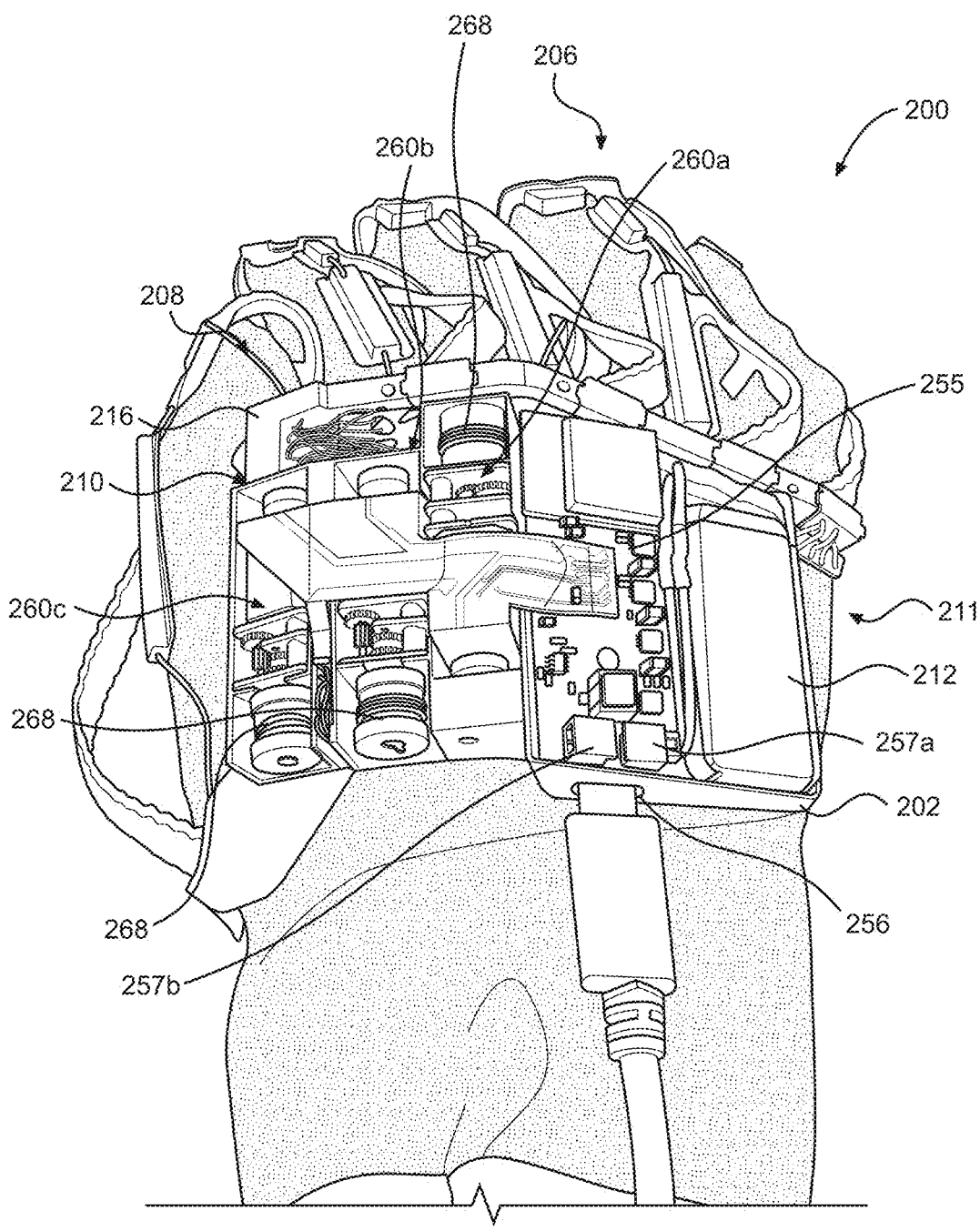
FIG. 16 illustrates a view of the other haptic glove system with a portion of a main body removed to show an actuator pack and electronics of the haptic glove system.

FIG. 16 shows a view of the haptic glove system 200 with a portion of the main body 202 removed to expose the actuator pack 210 and electronics 211 mounted within the main body 202. The actuator pack 210 can include the features, structures, relationships, etcetera described previously with respect to the actuator pack 110. The electronics 211 can include aspects of the control system 1900, described further later.

The actuator pack 210 can be positioned within the first portion 216 of the main body 202. The actuator pack 210 can include the first actuator 260a, the second actuator 260b, and the third actuator 260c, as previously described. Each of the first actuator 260a, the second actuator 260b, and the third actuator 260c can include a motor, a geartrain, and an output shaft coupled to a spindle 268, as previously described. In at least some aspects, the actuator pack 210 can be oriented so that the respective spindles 268 of the first actuator 260a, the second actuator 260b, and the third actuator 260c face respective cable exits channels formed in the first portion 216. In at least some implementations, at least one of the first actuator 260a, the second actuator 260b, and the third actuator 260c can be offset and/or inverted relative to at least one other one of the first actuator 260a, the second actuator 260b, and the third actuator 260c. For example, the first actuator 260a can be offset and/or inverted with respect to each of the second actuator 260b and the third actuator 260c such that the spindle 268 of the first actuator 260a is positioned on an opposite end of the main body 202 relative to the spindles 268 of the second actuator 260b and the third actuator 260c. This can be advantageous in that it can realize space-efficient routing for the resistance cables 208 and can minimize interference among neighboring routing features within the first portion 216 of the main body 202.

Resistance cables 208 can be routed from the spindles 268 of the respective actuators into the channels of the main body 202, which direct the resistance cables 208 toward respective sheaths 206, as described previously. In at least some implementations, the index- and thumb-directed resistance cable paths can incorporate local 90-degree turns to maintain low-friction transitions within the channels of the main body 202.

The actuator pack 210 can include the actuator pack controller subsystem, as described previously. Alternatively, the actuator pack controller subsystem can be an aspect of the electronics 211. The electronics 211 can include a printed circuit board 255, which can control the actuators and can provide power management and communication for the haptic glove system 200. The haptic glove system 200 can include a human-machine interface (HMI) (e.g., a button) accessible through the main body 202. The electronics can include an input/output, I/O 256, such as for example a USB-C port. The I/O 256 can be exposed at a perimeter of the first portion 216 for charging and data exchange. For compactness, high-profile components of the electronics 211, such as power inductors and/or the I/O 256, can be positioned over one or more local recesses formed in the first portion 216. As described previously, the printed circuit board 255 can include left-right symmetry features. For example, in at least some implementations the printed circuit board 255 can include a first power connector 257a and a second power connector 257b. In at least some aspects, only one of the first power connector 257a and the second power connector 257b is connected to the power source depending upon whether the haptic glove system 200 is implemented in a left or right handed configuration.

Vibrotactile electronics can be provided on a flex printed circuitry board sub-assembly. The vibrotactile electronics can service the vibration motors 204 distributed throughout the haptic glove system 200. The flex printed circuitry board sub-assembly can connect to the printed circuit board 255 via a board-to-board connector. In at least some implementations, metal stiffeners can be bonded to the flex printed circuitry board sub-assembly to define controlled-bend regions so that the flex printed circuitry board sub-assembly can conform to stepped surfaces of the first portion 216 while remaining flat where required for reliable connector engagement and strain relief. This arrangement can enable the vibrotactile wiring to cross changes in elevation within the first portion 216 without increasing bulk of the haptic glove system 200 or interfering with routing of resistance cables 208.

The haptic glove system 200 can include the battery 212, which can be housed in the main body 202 together with the electronics 211 and the actuator pack 210. In the at least some implementations, the battery 212 can be positioned proximate to the actuator pack 210 to promote a compact form factor and balanced mass distribution.

Figure 17:
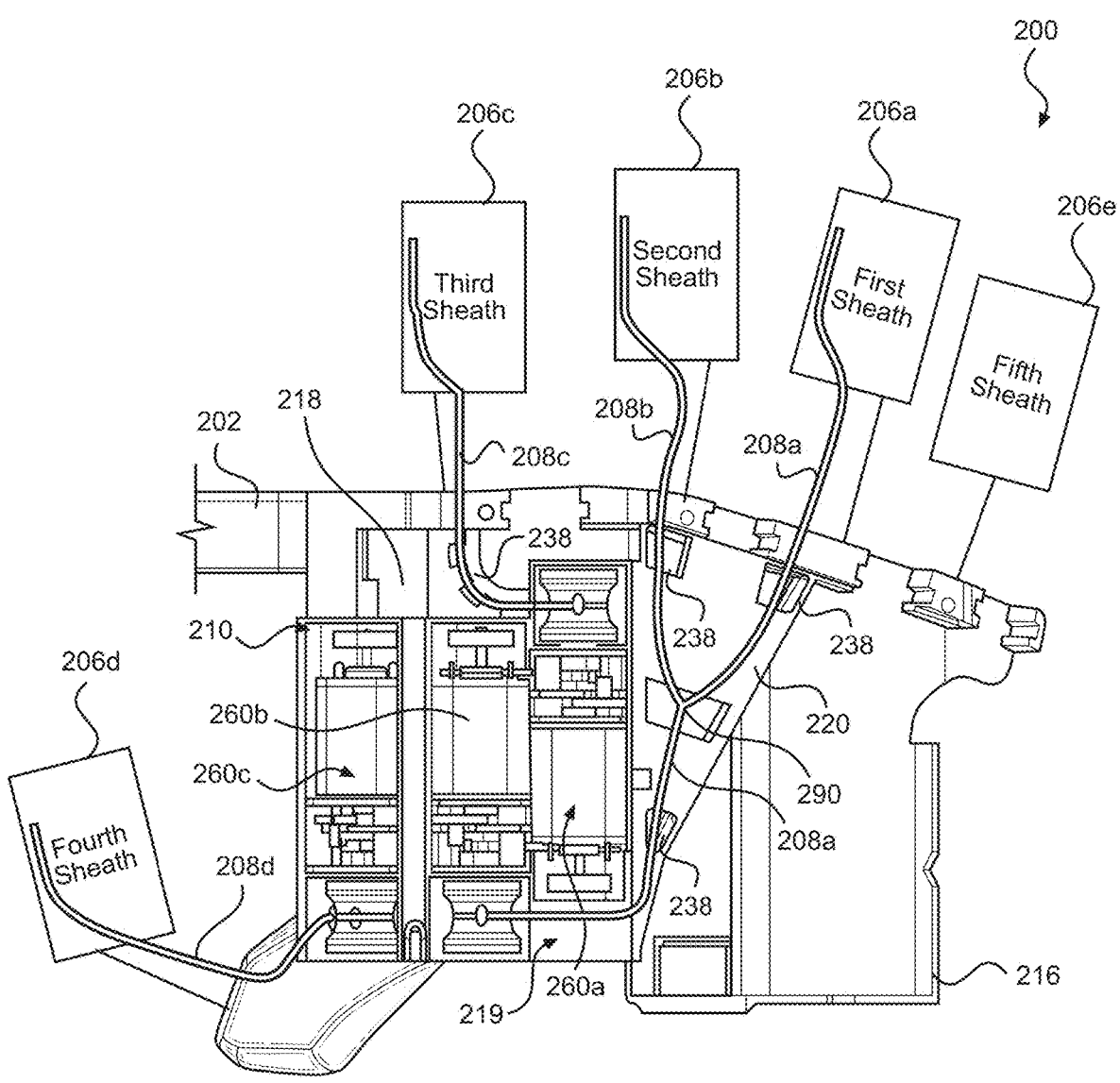
FIG. 17 illustrates a schematic view of the other haptic glove system including aspects directed to actuation of resistance cables of the haptic glove system.

FIG. 17 illustrates a schematic view of a haptic glove system 200 with the portion of the main body 202 and the electronics 211 removed to more clearly show aspects directed to actuation of resistance cables 208 for providing the haptic force feedback. In at least some implementations, the haptic glove system 200 can include a first sheath 206a, a second sheath 206b, a third sheath 206c, a fourth sheath 206d, and/or a fifth sheath 206e. The sheaths 206 can be contoured to correspond to different fingers of a user. For example, the first sheath 206a can be contoured to a ring finger, the second sheath 206b can be contoured to a middle finger, the third sheath 206c can be contoured to an index finger, the fourth sheath 206d can be contoured to a thumb, and the fifth sheath 206e can be contoured to a pinky. In at least some aspects, the fifth sheath 206e is not connected to a resistance cable and, accordingly, the actuator-induced force feedback described herein is not applied to the fifth sheath 206e.

As described elsewhere, the haptic glove system 200 can control a resistance applied to selected sheaths 206 to resist the closing of those sheaths and thereby provide haptic force feedback to corresponding fingers of a user. For example, a main body 202 can guide the resistance cables 208 between the actuator pack 210 and the sheaths 206 via channels 238 distributed throughout the main body 202. In at least some aspects, the haptic glove system 200 can be provided without the guides 140 associated with the haptic glove system 100. This can be advantageous for reducing complexity and improving manufacturability of the haptic glove system 200. Alternatively, the haptic glove system 200 can include one or more of the previously described guides. In at least some embodiments, the channels 238 can be integral low-friction pathways formed in the main body 202 (e.g., printed or molded features), thereby obviating separate PTFE or other tubing while maintaining appropriate cable routing and minimizing friction.

In at least some implementations, the haptic glove system 200 can include a first resistance cable 208a, a second resistance cable 208b, a third resistance cable 208c, and/or a fourth resistance cable 208d. The first resistance cable 208a can couple the second actuator 260b to both the first sheath 206a and the second sheath 206b. For example, in some implementations, the first resistance cable 208a can be directly connected to the second actuator 260b and to the first sheath 206a. Alternatively, the first resistance cable 208a can be indirectly connected to the first sheath 206a via another resistance cable (not shown). The first resistance cable 208a can be indirectly connected to the second sheath 206b via the second resistance cable 208b. For example, the first resistance cable 208a and the second resistance cable 208b can be tied together at a junction 290. The junction 290 can be a knot (e.g., an Albright knot), a bead, a crimp, a weld, a teeter, a molded connector, among other possibilities. In at least some embodiments, the junction 290 can be a knot, which can obviate the teeter 122 of the haptic glove system 100 to simplify and improve the compactness of the haptic glove system 200. The junction 290 can mechanically connect the first resistance cable 208a with the second resistance cable 208b such that retraction of the first resistance cable 208a by the second actuator 260b applies resistance both to the first sheath 206a and to the second sheath 206b.

The actuator pack 210 can be positioned within the first recess 218 of the first portion 216. The junction 290 can be positioned within the second recess 220 of the first portion 216. The recess 220 can allow for limited movement of the junction 290 (e.g., side-to-side and/or front-to-back). This configuration can provide sufficient compliance to preserve at least some independent motion between the first sheath 206a and the second sheath 206b when force feedback is not applied, while enabling simultaneous resistance when the force feedback is applied.

As described previously, at least one of the actuators can be offset and/or inverted relative to at least one other one of the actuators. For example, the first actuator 260a can be both offset from and inverted relative to the second actuator 260b. Because the first actuator 260a can be both offset from and inverted relative to the second actuator 260b, a space 219 can be defined within the first recess 218 for routing the first resistance cable 208a from the actuator pack 210 to the second recess 220, as previously described.

The third resistance cable 208c can independently connect the actuator pack 210 to the third sheath 206c. For example, the third resistance cable 208c can independently connect the first actuator 260a to the third sheath 206c. The actuator pack 210 can retract the third resistance cable 208*c* to apply resistance to the third sheath 206*c* independently of the resistance applied to the first sheath 206*a*, the second sheath 206*b*, and/or the fourth sheath 206*d*.

Similarly, the fourth resistance cable 208*d* can independently connect the actuator pack 210 to the fourth sheath 206*d*. For example, the fourth resistance cable 208*d* can independently connect the third actuator 260*c* to the fourth sheath 206*d*. The actuator pack 210 can retract the fourth resistance cable 208*d* to apply resistance to the fourth sheath 206*d* independently of the resistance applied to the first sheath 206*a*, the second sheath 206*b*, and/or the third sheath 206*c*.

As described previously, the haptic glove system 200 can be provided without the teeter. Instead, the junction 290 within the recess 220 can perform the cable-combining function for the first sheath 206*a* and the second sheath 206*b*. This arrangement can reduce part count and improve compactness, while maintaining cable management and preserving perceived independence of motion during free movement. The absence of a resistance cable to the fifth sheath 206*e* can further simplify routing, conserve actuator capacity for the remaining sheaths, and reduce slack management demands without materially impacting overall user experience. The channels 238 can obviate the guides used for routing, which can reduce assembly complexity and component bulk while maintaining low friction cable travel.

Figure 18:
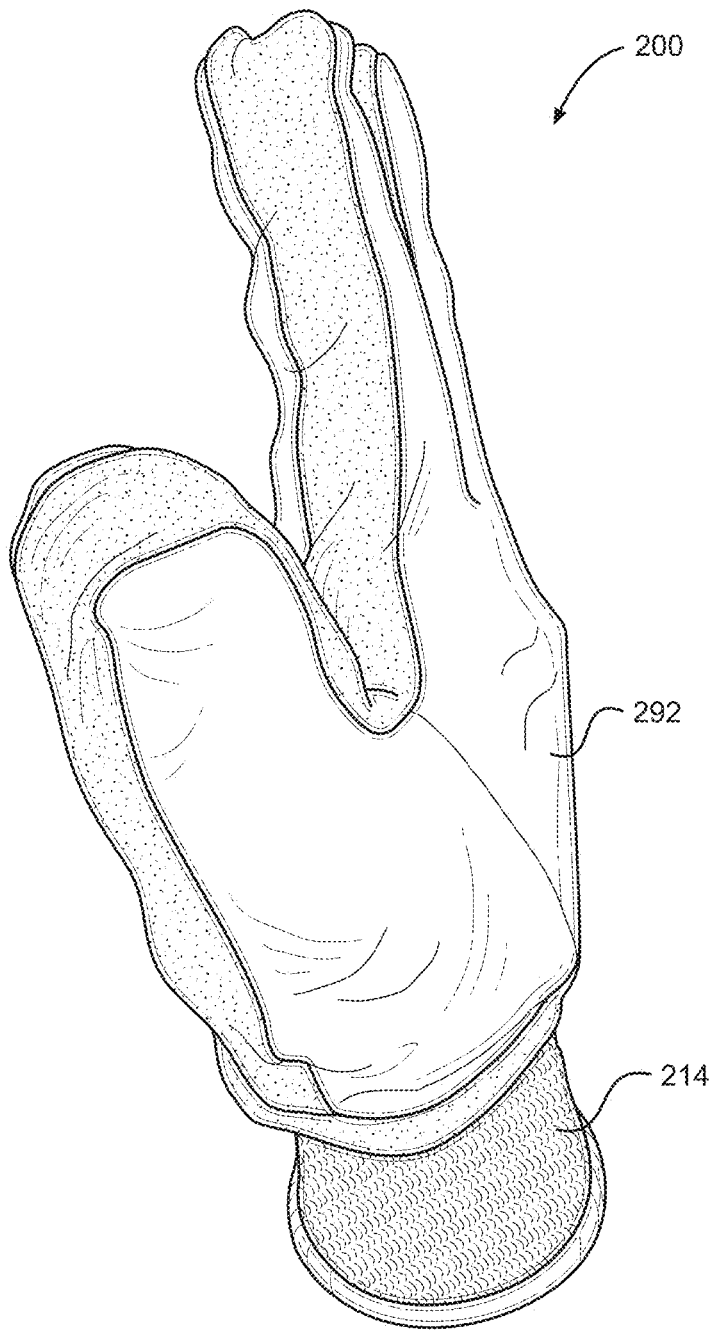
FIG. 18 illustrates a view of the other haptic glove system with an outer glove.

FIG. 18 shows a view of the haptic glove system 200. The haptic glove system 200 can include an outer glove 292 that can cover aspects of the haptic glove system 200 including, for example, the main body 202 (and each of the components contained therein including the actuator packs 210, the electronics 211, the battery 212, etcetera), the sheaths 206, the resistance cables 208, and at least some of the liner 214. The outer glove 292 can manage the routing of the resistance cables 208 by covering the resistance cables 208 to prevent tangling or other interference. The outer glove 292 can be contoured to the hand of a user. In aspects not shown, the haptic glove system 100 can include an outer glove having similar functionality.

Figure 19:
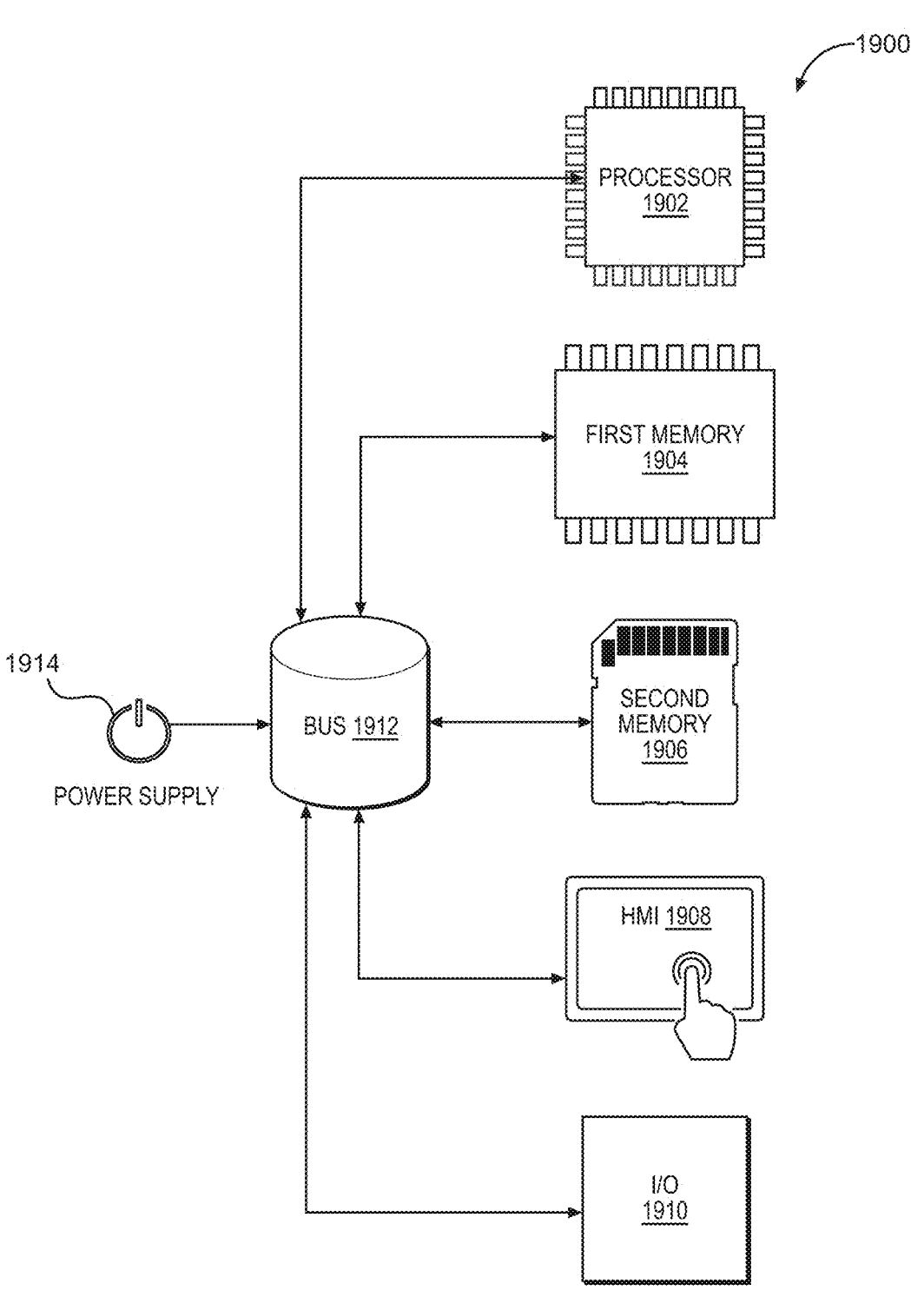
FIG. 19 illustrates a control system in accordance with aspects of this disclosure.

FIG. 19 shows a schematic view of the control system 1900 that can control aspects of the haptic glove systems of this disclosure (e.g., the haptic glove system 100 and/or the haptic glove system 200) including for example the vibration motors, the actuators, the battery, among other aspects. The electronics 211 can include any of the aspects of the control system 1900 described herein.

The control system 1900 can include one or more processors 1902, or CPUs, which can execute instructions from programs and can perform basic arithmetic, logic, control, and input/output operations. The processor 1902 can be a general purpose processor, a special processor, among other possibilities. As described previously, in some aspects the at least one processor 1902 can be provided within the first recess 118 of the main body 102. In some implementations, at least one other processor 1902 can be provided in the actuator pack controller subsystem 158 of the actuator pack 110. In some embodiments, the electronics 211 can include at least one processor 1902.

The control system 1900 can include a first memory 1904 (e.g., a random access memory or other computer readable storage medium) that can temporarily store data and instructions that the processor 1902 can quickly utilize to improve multitasking and the speed that the processor 1902 can execute tasks. The control system 1900 can include a second memory 1906 that can store data permanently (e.g., until instructed to delete the data) and/or for longer than the first memory 1904 to allow the data to be accessible after the control system 1900 has been turned off. The second memory 1906 can be any non-transitory computer readable medium capable of long term data storage including, for example, a hard disk drive, a removable storage drive (e.g., a flash memory, a universal serial bus drive, etcetera), combinations thereof, among other possibilities. In at least some embodiments, the second memory 1906 can include other structures or features for allowing computer programs or other instructions to be loaded into control system 1900 such as, for example, a removable storage unit, an interface, a program cartridge and cartridge interface, a removable memory chip and associated socket, combinations thereof, among other possibilities.

The control system 1900 can include an HMI 1908, or human machine interface, which can include any combination of features to allow a person to interact with or control the control system 1900. The HMI 154, as previously described, can be an embodiment of the HMI 1908. The HMI of the electronics 211 can be an embodiment of the HMI 1908. The HMI 1908 can include, for example, a display, a touchscreen, a keyboard, a mouse, a track pad, a button, a switch, a dial, a speaker, a microphone, a light, combinations thereof, among other possibilities.

The control system 1900 can include an I/O 1910, or input/output, which can facilitate communication between the control system 1900 and the outside world by transferring data to and from external devices, systems, or users. The I/O 156, as described previously, can be an embodiment of the I/O 1910. The I/O 256 of the electronics 211 can be an embodiment of the I/O 1910. The I/O 1910 can include, for example, a network interface, a communication port, combinations thereof, among other possibilities. Software and data transferred via the I/O 1910 can be in the form of signals, which can be electronic, electromagnetic, optical, or other signals capable of being received by I/O 1910. Such signals can be provided to the I/O 1910 via a communication path that can carry signals. Such a communication path can be implemented using wire, cable (e.g., fiber optics), wirelessly (e.g., via a cellular link, an RF link, Bluetooth, etcetera), combinations thereof, among other possibilities. In at least some embodiments, such a communication path can be an aspect of the control system 1900.

The control system 1900 can include a bus 1912, or other functionally equivalent structure, capable of transferring data between the various components of the control system 1900 including, e.g., the processor 1902, the first memory 1904, the second memory 1906, the HMI 1908, the I/O 1910, combinations thereof, among other possibilities.

The control system 1900 can include or can be implemented with a power supply 1914 that can power some or all of the powered components of the control system 1900 or any of the powered components described herein. The battery 112, described previously, can be one embodiment of the power supply 1914. The battery 212, described previously, can be an embodiment of the power supply 1914. The power supply 1914 can be local, such as a battery, a capacitor, a photovoltaic cell, a fuel cell, combinations thereof, among other possibilities. Additionally, or alternatively, the power supply 1914 can be distributed over a grid, or the like, from a remote source.

Various aspects of this disclosure can be embodied as computer programs, computer control logic, databases, combinations thereof, among other possibilities. Such aspects can be stored on various non-transitory computer readable media (e.g., the first memory 1904, the second memory 1906, etcetera) and can be executed by the processor 1902.

Such aspects, when executed, can enable the processor 1902 (alone or together with other aspects of the control system 1900) to implement the various processes and capabilities, described previously. For example, the control system 1900 can be programed to control aspects of the haptic glove systems (e.g., the haptic glove system 100 and/or the haptic glove system 200) to provide vibrotactile feedback and/or force feedback.

Vibrotactile feedback can include tactile feedback, which can be used to convey a status of the haptic glove systems (e.g., the haptic glove system 100 and/or the haptic glove system 200) and information to the user during usage. For example, when the glove is starting up, paired to Bluetooth, low battery, etcetera Vibrotactile feedback can include material-based feedback. For example, each object in a virtual environment can be assigned a material with specific haptic properties. When the hand of a user of the haptic glove system (e.g., the haptic glove system 100 and/or the haptic glove system 200) interacts with an object, the corresponding vibration motors can be triggered, simulating the texture, hardness, or movement of that object. The intensity and duration of the vibrations can vary based on the properties of the material. This can allow the user to "feel" whether the object is soft (e.g., like a sponge) or hard (e.g., like a rock). Texture can be simulated with this approach by either a preset texture effect such as a waveform or more dynamic textures such as a wood grain where specific material parts have different vibration intensities. This can be used to simulate a smooth glass surface or a rough surface like sandpaper or carpet.

Vibrotactile feedback can include localized vibration. The vibration motors can provide localized feedback based on where the hand comes into contact with virtual objects. For instance, if only the fingertips touch an object, only the motors in the finger pads can activate, enhancing the realism of the interaction.

Vibrotactile feedback can include dynamic environmental effects, such as rain and wind. For example, small bursts of vibration can be triggered across the hand to simulate the sensation of raindrops landing on the skin. This effect can dynamically change depending on the intensity of the rain and the hand's position in the scene.

Vibrotactile feedback can include proximity-based feedback. For example, in a game featuring an energy orb, the vibrotactile feedback intensity can vary based on the hand's proximity to the orb. As the hand gets closer to the center of the orb, the vibration strength can increase, creating a gradual buildup of sensation. Different areas of the hand (fingertips or palm) can experience varying levels of intensity based on which part of the hand approaches the orb.

Force feedback can include object resistance simulation. When a user interacts with virtual objects, the actuator pack can activate to restrict finger movement via the sheaths, simulating the resistance one would feel when gripping or pressing a real object. For example, when grabbing a virtual ball, the haptic glove system (e.g., the haptic glove system 100 and/or the haptic glove system 200) can restrict finger movement based on the size and firmness of the ball, making it feel as though the user is physically holding it. The resistance can be adjusted dynamically depending on the physical properties of the object (e.g., a soft object allows more finger movement, while a hard object offers more resistance).

Force feedback can include shape and firmness feedback. The haptic glove systems (e.g., the haptic glove system 100 and/or the haptic glove system 200) can adapt to different object shapes and firmness levels by controlling the degree of finger movement restriction. For example, when interacting with a solid, rigid object like a cube, the actuator pack can provide firm resistance, preventing the fingers from fully closing. When manipulating a more flexible object, the actuator pack can allow for more finger movement, simulating the squishiness or pliability of the object.

Force feedback can include progressive feedback, whereby the force feedback is not only binary (on/off) but also incremental. That is, the level of resistance can increase progressively as the user interacts deeper with an object. For instance, as a user squeezes a virtual sponge or applies pressure to an object, the resistance provided by the haptic glove system (e.g., the haptic glove system 100 and/or the haptic glove system 200) can increase gradually, simulating the sensation of increased tension or deformation of the object.

Force feedback can include finger-specific feedback, whereby the haptic glove system (e.g., the haptic glove system 100 and/or the haptic glove system 200) can provide individual finger feedback. When interacting with complex shapes, sheath resistance can be controlled independently, ensuring that the user can feel variations in object geometry and physical response. For instance, when gripping an irregular object, certain fingers may experience more resistance than others, based on which part of the object they are contacting.

Force feedback can include adaptive feedback such as for object grasping. For example, when the user reaches out to grasp objects of different sizes or shapes, the haptic glove system (e.g., the haptic glove system 100 and/or the haptic glove system 200) can adjust to provide the appropriate amount of restriction, matching the physical characteristics of the object. This adaptive feedback can create a more realistic grasping experience, making the user feel as if they are holding a solid, tangible item.

It will be appreciated that the foregoing description provides examples of the invention. However, it is contemplated that other implementations of the invention may differ in detail from the foregoing examples. All references to the invention or examples thereof are intended to reference the particular example being discussed at that point and are not intended to imply any limitation as to the scope of the invention more generally. All language of distinction and disparagement with respect to certain features is intended to indicate a lack of preference for those features, but not to exclude such from the scope of the invention entirely unless otherwise indicated.

What is claimed is:

1. A haptic glove system comprising:
an actuator pack;
a first sheath configured to receive a first finger of a user;
a first resistance cable connected to the first sheath and to the actuator pack;
a second sheath configured to receive a second finger of the user; and
a second resistance cable connected to the second sheath and to the first resistance cable,
wherein the actuator pack is configured to retract the first resistance cable together with the second resistance cable to resist closing of each of the first sheath and the second sheath.

2. The haptic glove system of claim 1, wherein the first sheath and the second sheath are configured to be moved by the user independently from each other when the actuator pack is inactive.

3. The haptic glove system of claim 1, wherein:
the haptic glove system further comprises a main body, the main body comprises a recess, and the first resistance cable and the second resistance cable are coupled together via a junction that is movably contained within the recess.

4. The haptic glove system of claim 3, wherein:

the first sheath and the second sheath are connected to the main body, and the actuator pack is positioned within the main body.

5. The haptic glove system of claim 4, wherein the main body is positioned at a back of a hand of the user between knuckles and a wrist of the user when the haptic glove system is worn by the user.

6. The haptic glove system of claim 5, wherein:

the main body projects a maximum amount outwardly away from the back of the hand of the user when the haptic glove system is worn by the user, and the maximum amount is less than about a half an inch.

7. The haptic glove system of claim 4, further comprising:

a liner attached to the main body, and an outer glove that covers the actuator pack, the first sheath, the first resistance cable, the second sheath, and the second resistance cable.

8. The haptic glove system of claim 1, wherein:

the haptic glove system further comprises:

a third sheath that is configured to receive a third finger of the user;

a third resistance cable that independently connects the third sheath to the actuator pack;

a fourth sheath that is configured to receive a fourth finger of the user; and a fourth resistance cable that independently connects the fourth sheath to the actuator pack;

the actuator pack is configured to retract the third resistance cable to resist closing of the third sheath independently from the first sheath, the second sheath, and the fourth sheath, and the actuator pack is configured to retract the fourth resistance cable to resist closing of the fourth sheath independently from each of the first sheath, the second sheath, and the third sheath.

9. The haptic glove system of claim 1, wherein:

the actuator pack comprises a first actuator and a second actuator, and the first actuator is inverted and offset relative to the second actuator.

10. The haptic glove system of claim 1, wherein:

the haptic glove system further comprises a processor configured to control the actuator pack and a battery, the processor is substantially symmetrical, the processor comprises a first power connector and a second power connector, and the first power connector is connected to the battery, and the second power connector is disconnected.

11. A haptic glove system comprising:

a sheath comprising a tip, the sheath being configured to receive a finger of a user; and a resistance cable routed circumferentially around the tip, wherein:

retraction of the resistance cable squeezes the tip, and the tip is biased in an open configuration such that the tip automatically reverts to the open configuration when the resistance cable is released after the retraction that squeezes the tip.

12. The haptic glove system of claim 11, further comprising an actuator pack connected to the resistance cable and configured to retract the resistance cable.

13. The haptic glove system of claim 12, wherein:

the haptic glove system further comprises a main body contoured to a hand of the user, the sheath of the haptic glove system is connected to the main body, the actuator pack is positioned within the main body, and the main body, when worn by the user, holds the actuator pack at a back of the hand of the user.

14. The haptic glove system of claim 13, wherein the main body comprises a plurality of relief cuts.

15. The haptic glove system of claim 13, wherein the haptic glove system further comprises electronics and a battery that are positioned within the main body together with the actuator pack.

16. The haptic glove system of claim 13, wherein the main body further comprises a portion contoured to a palm of the hand of the user.

17. The haptic glove system of claim 16, wherein:

the haptic glove system further comprises a plurality of vibration motors, and the portion holds the plurality of vibration motors.

18. The haptic glove system of claim 11, wherein the sheath comprises:

a first support contoured to at least part of a side of the finger of the user, the first support comprising relief cuts;

a plurality of second supports extending from the first support, the plurality of second supports are each contoured to a respective finger segment of the user; and a plurality of vibration motors that are each supported by a respective one of the plurality of second supports such that the plurality of vibration motors are held to a respective finger pad of the respective finger segment of the user when the sheath of the haptic glove system is worn by the user.

19. The haptic glove system of claim 18, wherein:

the sheath for the haptic glove system further comprises at least one guide for guiding the resistance cable, and the at least one guide is supported by at least one third support.

20. The haptic glove system of claim 19, wherein the at least one guide is supported opposite one of the plurality of vibration motors.

* * * * *